United States Patent
Wijaya et al.

(10) Patent No.: US 10,205,207 B2
(45) Date of Patent: Feb. 12, 2019

(54) IONIC LIQUID ELECTROLYTE AND FLUORINATED CARBON ELECTRODE

(71) Applicant: Nanyang Technological University, Singapore (SG)

(72) Inventors: Olivia Wijaya, Singapore (SG); Rachid Yazami, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 14/761,589

(22) PCT Filed: Feb. 28, 2014

(86) PCT No.: PCT/SG2014/000098
§ 371 (c)(1),
(2) Date: Jul. 16, 2015

(87) PCT Pub. No.: WO2014/133466
PCT Pub. Date: Sep. 4, 2014

(65) Prior Publication Data
US 2015/0364801 A1  Dec. 17, 2015

Related U.S. Application Data

(60) Provisional application No. 61/770,372, filed on Feb. 28, 2013.

(51) Int. Cl.
*H01M 12/08* (2006.01)
*H01M 4/133* (2010.01)
(Continued)

(52) U.S. Cl.
CPC .......... *H01M 12/08* (2013.01); *H01M 4/133* (2013.01); *H01M 4/1393* (2013.01);
(Continued)

(58) Field of Classification Search
None
See application file for complete search history.

(56) References Cited

U.S. PATENT DOCUMENTS

| 4,639,297 A | 1/1987 | Suematsu et al. |
| 6,358,649 B1 | 3/2002 | Yazami et al. |

(Continued)

FOREIGN PATENT DOCUMENTS

| EP | 1 879 252 A1 | 1/2008 |
| WO | 2009/078668 A2 | 6/2009 |
| WO | 2010/124172 A2 | 10/2010 |

OTHER PUBLICATIONS

Data sheet for 1,2-Dimethoxyethane. <<http://www.chemicalbook.com/ChemicalProductProperty_EN_CB9232185.htm>> Accessed Dec. 5, 2017.*

(Continued)

*Primary Examiner* — Alix E Eggerding
(74) *Attorney, Agent, or Firm* — Seed IP Law Group

(57) ABSTRACT

The invention relates to an electrolyte for a metal air battery, and in particular, to an ionic liquid electrolyte for a metal air battery. The ionic liquid electrolyte includes an additive to improve oxygen solubility thereof. The invention also define a method of impregnating a fluorinated carbon compound into an electrode comprising depositing onto the electrode a dispersion comprising the fluorinated carbon compound dissolved in an organic solvent and placing the electrode in an inert environment.

13 Claims, 32 Drawing Sheets

| Solvent | $O_2$ solubility (at 25°C) | Viscosity (cst at 25°C) |
|---|---|---|
| $PYR_{14}TFSI$ (Ionic liquid) | $3.4 \times 10^{-3}$ | 89 |
| HFE 7000 (PFC) | 0.35 | 0.32 |
| 1,2 Dimethoxyethane | 0.21 | 0.41 |

Properties of PYR14TFSI and HFE 7000

(51) Int. Cl.
H01M 4/1393 (2010.01)
H01M 4/583 (2010.01)
H01M 12/02 (2006.01)

(52) U.S. Cl.
CPC ............ *H01M 4/583* (2013.01); *H01M 12/02* (2013.01); *H01M 2300/0028* (2013.01); *H01M 2300/0045* (2013.01); *Y02E 60/128* (2013.01)

(56) References Cited

U.S. PATENT DOCUMENTS

| | | | |
|---|---|---|---|
| 7,645,543 B2 | 1/2010 | Visco et al. | |
| 8,815,453 B1* | 8/2014 | Tsukamoto | H01M 4/13 429/188 |
| 2009/0280400 A1* | 11/2009 | Tsukamoto | C09K 21/06 429/120 |
| 2010/0141211 A1 | 6/2010 | Yazami | |
| 2010/0255356 A1* | 10/2010 | Fujii | H01G 11/06 429/94 |
| 2010/0266907 A1 | 10/2010 | Yazami | |
| 2011/0171540 A1 | 7/2011 | Hasegawa et al. | |
| 2012/0041507 A1 | 2/2012 | Wang et al. | |
| 2013/0040210 A1* | 2/2013 | Mizuno | H01M 12/06 429/405 |
| 2013/0337341 A1* | 12/2013 | Tikhonov | H01M 10/0569 429/326 |

OTHER PUBLICATIONS

Data sheet for 1-Methoxyheptafluoropropane. <<https://www.sigmaaldrich.com/catalog/product/sigma/shh0001?lang=en&region=US>> Accessed Dec. 5, 2017.*
3M Product Information, "3M Novec™ 7000 Engineered Fluid," 2005, 8 pages.
Abraham et al., "A Polymer Electrolyte-Based Rechargeable Lithium/Oxygen Battery," *J. Electrochem. Soc.* 143(1):1-5, Jan. 1996.
Allen et al., "Oxygen Electrode Rechargeability in an Ionic Liquid for the Li-Air Battery," *The Journal of Physical Chemistry Letters* 2:2420-2424, 2011.
Allen et al., "Oxygen Reduction Reactions in Ionic Liquids and the Formulation of a General ORR Mechanism for Li-Air Batteries," *The Journal of Physical Chemistry C* 116(39):20755-20764, 2012.
Aurbach et al., "The electrochemistry of noble metal electrodes in aprotic organic solvents containing lithium salts," *Journal of Electroanalytical Chemistry* 297:225-244, 1991.
Babiak et al, "On the miscibility of ethers and perfluorocarbons," *Journal of Fluorine Chemistry* 129(5):397-401, 2008.
Balaish et al., "A critical review on lithium-air battery electrolytes," *Phys. Chem. Chem. Phys.* 16:2801-2822, 2014.
Battino et al., "The Solubility of Oxygen and Ozone in Liquids," *Journal of Physical and Chemical Reference Data* 12(2):163-178, 1983.
Black et al., "The Role of Catalysts and Peroxide Oxidation in Lithium-Oxygen Batteries," *Angew. Chem. Int. Ed.* 52:392-396, 2013.
Cecchetto et al., "Study of a Li-air battery having an electrolyte solution formed by a mixture of an ether-based aprotic solvent and an ionic liquid," *Journal of Power Sources* 213:233-238, 2012.
Clark Jr. et al., "Survival of Mammals Breathing Organic Liquids Equilibrated with Oxygen at Atmospheric Pressure," *Science* 152(3730):1755-1756, 1966.
Débart et al., "An $O_2$ cathode for rechargeable lithium batteries: The effect of a catalyst," *Journal of Power Sources* 174(2):1177-1182, 2007.
Débart et al., "α-$MnO_2$ Nanowires: a Catalyst for the $O_2$ Electrode in Rechargeable Lithium Batteries," *Angew. Chem. Int. Ed.* 47(24):4521-4524, 2008.
Freunberger et al., "The Lithium-Oxygen Battery with Ether-Based Electrolytes.," *Angew. Chem. Int. Ed.* 50(37):8609-8613, 2011.
Hardwick et al., "The pursuit of rechargeable non-aqueous lithium-oxygen battery cathodes," *Current Opinion in Solid State and Materials Science* 16:178-185, 2012.
He et al., "A Li-air fuel cell with recycle aqueous electrolyte for improved stability," *Electrochemistry Communications* 12:1686-1689, 2010.
Huang et al., "The Reduction of Oxygen in Various Room Temperature Ionic Liquids in the Temperature Range 293-318 K: Exploring the Applicability of the Stokes-Einstein Relationship in Room Temperature Ionic Liquids," *Journal of Physical Chemistry B* 113:8953-8959, 2009.
International Application Status Report generated May 27, 2015, for corresponding International Application No. PCT/US2010/032182, 2 pages.
Katayama et al., "Electrochemical Behavior of Oxygen/Superoxide Ion Couple in 1-Butyl-1-methylpyrrolidinium Bis(trifluoromethylsulfonyl)imide Room-Temperature Molten Salt," *Journal of the Electrochemical Society* 152(8):E247-E250, 2005.
Katayama et al., "Electrochemical Reduction of Oxygen in Some Hydrophobic Room-Temperature Molten Salt Systems," *Journal of the Electrochemical Society* 151(1):A59-A63, 2004.
Krafft et al., "Chapter 11: Perfluorochemical-Based Oxygen Therapeutics, Contrast Agents, and Beyond," in *Fluorine and Health*, Tressud et al;., (eds.), Elsevier B.V., Amsterdam, pp. 448-486, 2008.
Kumar et al., "A Solid-State, Rechargeable, Long Cycle Life Lithium-Air Battery," *Journal of the Electrochemical Society* 157(1):A50-A54, 2010.
Laoire et al., "Elucidating the Mechanism of Oxygen Reduction for Lithium-Air Battery Applications," *Journal of Physical Chemistry C* 113:20127-20134, 2009.
Laoire et al., "Influence of Nonaqueous Solvents on the Electrochemistry of Oxygen in the Rechargeable Lithium-Air Battery," *Journal of Physical Chemistry C* 114:9178-9186, 2010.
Laoire et al., "Rechargeable Lithium/TEGDME-$LiPF_6$/$O_2$ Battery," *Journal of the Electrochemical Society* 158(3):A302-A308, 2011.
Lee et al., "Metal-Air Batteries with High Energy Density: Li-Air versus Zn-Air," *Adv. Energy Mater.* 1(1):34-50, 2011.
Lu et al., "Platinum-Gold Nanoparticles : A Highly Active Bifunctional Electrocatalyst for Rechargeable Lithium-Air Batteries," *J. Am. Chem. Soc.* 132:12170-12171, 2010.
Lu et al., "The Influence of Catalysts on Discharge and Charge Voltages of Rechargeable Li-Oxygen Batteries," *Electrochemical and Solid-State Letters* 13(6):A69-A72, 2010.
McCloskey et al., "On the Efficacy of Electrocatalysis in Nonaqueous Li—$O_2$ Batteries," *J. Am. Chem. Soc.* 133(45):18038-18041, 2011.
McCloskey et al., "On the Mechanism of Nonaqueous Li—$O_2$ Electrochemistry on C and Its Kinetic Overpotentials: Some Implications for Li-Air Batteries," *The Journal of Physical Chemistry C* 116:23897-23905, 2012.
McCloskey et al., "Solvents' Critical Role in Nonaqueous Lithium-Oxygen Battery Electrochemistry," *J. Phys. Chem. Lett.* 2:1161-1166, 2011.
Meini et al., "The Effect of Water on the Discharge Capacity of a Non-Catalyzed Carbon Cathode for Li—$O_2$ Batteries," *Electrochemical and Solid State Letters* 15(4):A45-A48, 2012.
Mirzaeian et al., "Characterizing capacity loss of lithium oxygen batteries by impedance spectroscopy," *Journal of Power Sources* 195(19):6817-6824, 2010.
Mirzaeian et al., "Preparation of controlled porosity carbon aerogels for energy storage in rechargeable lithium oxygen batteries," *Electrochimica Acta* 54:7444-7451, 2009.
Mitchell et al., "All-carbon-nanofiber electrodes for high-energy rechargeable Li—$O_2$ batteries," *Energy and Environmental Science* 4(8):2952-2958, 2011.
Mizuno et al., "Rechargeable Li-Air Batteries with Carbonate-Based Liquid Electrolytes," *J. Electrochem.* 78(5):403-405, 2010.
Monaco et al., "An electrochemical study of oxygen reduction in pyrrolidinium-based ionic liquids for lithium/oxygen batteries," *Electrochimica Acta* 83:94-104, 2012.
Ogasawara et al., "Rechargeable $Li_2O_2$ Electrode for Lithium Batteries," *J. Am. Chem. Soc.* 128(4):1390-1393, 2006.

(56) References Cited

OTHER PUBLICATIONS

Oh et al., "Decomposition Reaction of Lithium Bis(oxalato)borate in the Rechargeable Lithium-Oxygen Cell," *Electrochem. and Solid-State Lett.* 14(12):A185-A188, 2011.

Oswald et al., "XPS investigations of electrolyte/electrode interactions for various Li-ion battery materials," *Analytical and Bioanalytical Chemistry* 400:691-696, 2011.

Park et al., "Electrochemical Performances of Lithium-air Cell with Carbon Materials," *Bull. Korean Chem. Soc.* 31(11):3221-3224, 2010.

Radin et al., "Lithium Peroxide Surfaces and Point Defects: Relevance for Li-air Batteries," Battery Congress: Ann Arbor, MI, Apr. 11-12, 2011.

Radin et al., "Lithium Peroxide Surfaces Are Metallic, While Lithium Oxide Surfaces Are Not," *Journal of the American Chemical Society* 134(2):1093-1103, 2012.

Read et al., "Oxygen Transport Properties of Organic Electrolytes and Performance of Lithium/Oxygen Battery," *Journal of Electrochemical Society* 150(10):A1351-A1356, 2003.

Read, "Characterization of the Lithium/Oxygen Organic Electrolyte Battery," *Journal of Electrochemical Society* 149(9):A1190-A1195, 2002.

Read, "Ether-Based Electrolytes for the Lithium/Oxygen Organic Electrolyte Battery," *Journal of the Electrochemical Society* 153(1):A96-A100, 2006.

Shimonishi et al., "A study on lithium/air secondary batteries—Stability of NASICON-type glass ceramics in acid solutions," *Journal of Power Sources* 195(18):6187-6191, 2010.

Tan et al., "Synthesis and Characterization of Biphenyl-Based Lithium Solvated Electron Solutions," *The Journal of Physical Chemistry B* 116(30):9056-9060, 2012.

Veith et al., "Spectroscopic Characterization of Solid Discharge Products in Li-Air Cells with Aprotic Carbonate Electrolytes," *Journal of Physical Chemistry C* 115:14325-14333, 2011.

Viswanathan et al., "Electrical conductivity in $Li_2O_2$ and its role in determining capacity limitations in non-aqueous $Li-O_2$ batteries," *The Journal of Chemical Physics* 135(21):214704, 2011, 11 pages.

Wang et al., "A lithium-air fuel cell using copper to catalyze oxygen-reduction based on copper-corrosion mechanism," *Chemical Communication* 46:6305-6307, 2010.

Wang et al., "High rate oxygen reduction in non-aqueous electrolytes with the addition of perfluorinated additives," *Energy Environ. Sci.* 4:3697-3702, 2011.

Xiao et al., "Hierarchically Porous Graphene as a Lithium-Air Battery Electrode," *Nano Lett.* 11:5071-5078, 2011.

Xu et al., "Investigation on the charging process of $Li_2O_2$-based air electrodes in $Li-O_2$ batteries with organic carbonate electrolytes," *Journal of Power Sources* 196:3894-3899, 2011.

Ye et al., "Li Ion Conducting Polymer Gel Electrolytes Based on Ionic Liquid/PVDF-HFP Blends," *Journal of Electrochemical Society* 154(11):A1048-A1057, 2007.

Zhang et al., "A non-aqueous electrolyte for the operation of Li/air battery in ambient environment," *Journal of Power Sources* 196(8):3906-3910, 2011.

Zhang et al., "Electroreduction of Dioxygen in 1-n-Alkyl-3-methylimidazolium Tetrafluoroborate Room-Temperature Ionic Liquids," *Journal of the Electrochemical Society* 151(4):D31-D37, 2004.

Zhang et al., "$Fe_2O_3$ nanocluster-decorated graphene as $O_2$ electrode for high energy $Li-O_2$ batteries," *RSC Advances* 2:8508-8514, 2012.

Zhang et al., "Novel composite polymer electrolyte for lithium air batteries," *Journal of Power Sources* 195:1202-1206, 2010.

Zhang et al., "Partially fluorinated solvent as a co-solvent for the non-aqueous electrolyte of Li/air battery," *Journal of Power Sources* 196:2867-2870, 2011.

Zhang et al., "Stability of a Water-Stable Lithium Metal Anode for a Lithium-Air Battery with Acetic Acid-Water Solutions," *Journal of the Electrochemical Society* 157(2):A214-A218, 2010.

Zhang et al., "The development and challenges of rechargeable non-aqueous lithium-air batteries," *International Journal of Smart and Nano Materials* 4(1):27-46, 2013.

Zhang et al., "Water-Stable Lithium Anode with the Three-Layer Construction for Aqueous Lithium-Air Secondary Batteries," *Electrochemical and Solid State Letters* 12(7):A132-A135, 2009.

Zhou, "Development of a New-type Lithium-Air Battery with Large Capacity," National Institute of Advanced Industrial Science and Technology, Feb. 24, 2009, retrieved from http://www.aist.go.jp/aist_e/latest_research/2009/20090727/20090727.html, May 29, 2015, 4 pages.

\* cited by examiner

FIG. 1

| Solvent | O$_2$ solubility (at 25°C) | Viscosity (cst at 25°C) |
|---|---|---|
| PYR$_{14}$TFSI (Ionic liquid) | 3.4 x10$^{-3}$ | 89 |
| HFE 7000 (PFC) | 0.35 | 0.32 |
| 1,2 Dimethoxyethane | 0.21 | 0.41 |

Properties of PYR14TFSI and HFE 7000

PYR                    TFSI

FIG. 5

0.025 M $Li^+$ in EMITFSI

Cathodic

$EMI^+ + O_2 + e^- \rightarrow EMI^+ \cdots O_2^-$ — C1

$Li^+ + O_2 + e^- \rightarrow LiO_2$ — C1

$2LiO_2 \rightarrow Li_2O_2 + O_2$

Anodic

$EMI^+ \cdots O_2^- \rightarrow EMI^+ + O_2 + e^-$ — A1

$LiO_2 \rightarrow Li^+ + O_2 + e^-$ — A2

$Li_2O_2 \rightarrow 2Li^+ + O_2 + 2e^-$ — A3

FIG. 10

| Function | Material/Chemical | Supplier |
|---|---|---|
| Anode | Lithium foil 99.99 % | Chongqing Kunyu |
| Cathode | Graphitized acetylene black | Sigma Aldrich |
| Binder | PVDF HSV 900 | Arkema Inc |
| Separator | Monolayer polyethylene | Celgard |
| Solvent for cathode fabrication | N-Methyl-2-pyrrolidone, anhydrous | Sigma Aldrich |
| Solvent for electrolyte | 1,2 Dimethoxyethane, anhydrous | Sigma Aldrich |
| Salt | Lithium perchlorate, anhydrous | Sigma Aldrich |
| | Tetrabutylammonium perchlorate, anhydrous | Sigma Aldrich |
| Additives/co-solvent | 1-methoxyheptafluoropropane (HFE 7000), 99.5 % | 3 M |
| | Perfluoroheptane | Tokyo Chemical |
| Gas reactant | Pure $O_2$, 99.99 % | NOX |

Materials employed in the fabrication of lithium oxygen cell

FIG. 14

| Electrolyte | Water content (ppm) | Expected oxygen soluble in 150 µl electrolyte (µl) |
|---|---|---|
| 0.1 M LiClO4: DME | 59.5 | 32.2 |
| 0.1 M LiClO4 DME:HFE 7000 9.1 vol % | 54.5 | 34.0 |
| 0.1 M LiClO4:DME:HFE 7000 23.1 vol % | 58.7 | 36.8 |
| 0.1 M LiClO4:DME:HFE 7000 33.3 vol % | 56.9 | 38.4 |

Electrolyte mixture of dimethoxyethane and perfluorocarbon liquid

FIG. 15
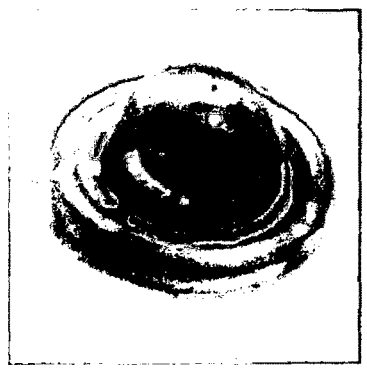
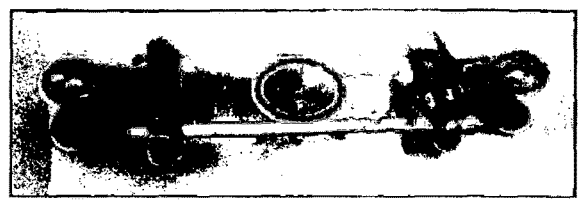

FIG. 16

|  | | Raman cell |
|---|---|---|
| Materials | PMMA : Poly(methyl-methacrylate), low O2 permeation, high H2O permeation. | *Soda lime* glass 0.2mm thick |
| Leak test | shiny Li foil prepared in Glove box | shiny Li foil prepared in Glove box |

| Maximum time before shiny Li foil shows dark spots | 30 min | 4 hours |
|---|---|---|

Material of air tight cells and leak test results

FIG. 20

| Sample | BET SA m²/g | Pore volume mL/g |
|---|---|---|
| Graphitized acetylene black | 75.4 | 0.3 |
| Graphitized acetylene black with 20 wt % PVDF | 25.5 | 0.4 |

BET surface area and pore volume measurement of graphitized acetylene black powder and 20 wt % PVDF electrode

FIG. 22
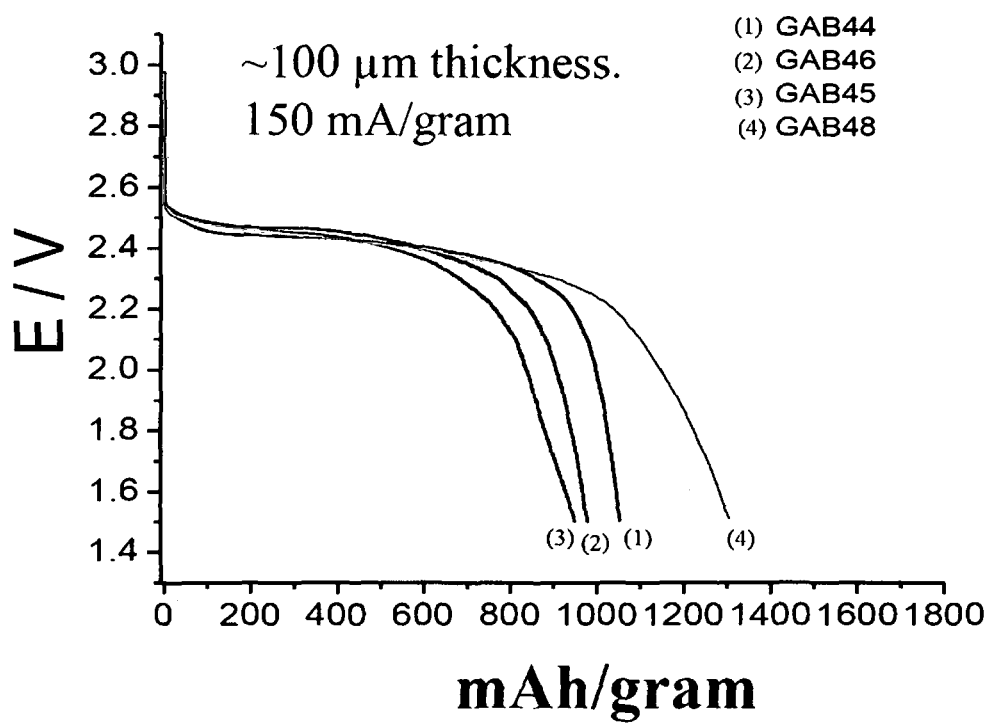
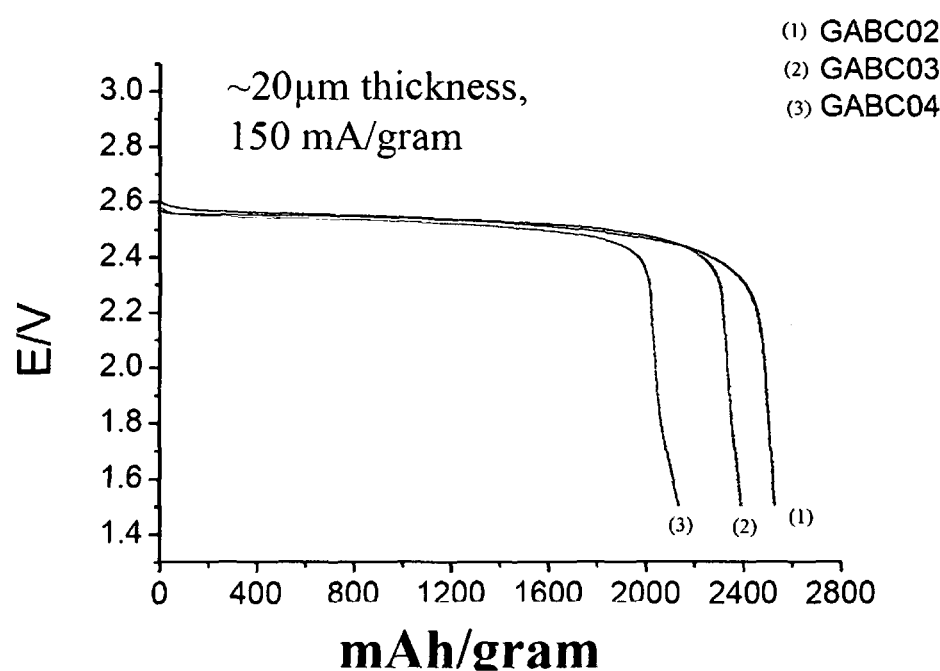

FIG. 23

| Material | $H_2O$ | $CO_2$ | $N_2$ | $O_2$ |
|---|---|---|---|---|
| Low Density Polyethylene (LDPE) | 68 | 9.5 | 0.73 | 2.2 |
| High Density Polyethylene (HDPE) | 9.0 | 0.27 | 0.11 | 0.3 |
| Poly(chlorotrifluoroethylene) *(Kel-F)* | *0.218* | *0.158* | *0.00375* | *0.030* |
| Poly(methylmetacrylate) (PMMA) | 480 | - | - | 0.116 |
| Poly(tetrafluoroethylene)(PTFE) | 13.4 | 7.5 | 10 | 3.2 |
| Permeability unit→ $P.10^{13}$ $(cm^3 \times cm)/(cm^2 \times s \times Pa)$ | | | | |

Permeability of water and gases of several polymers used as possible washer in the EL-cell

FIG. 28
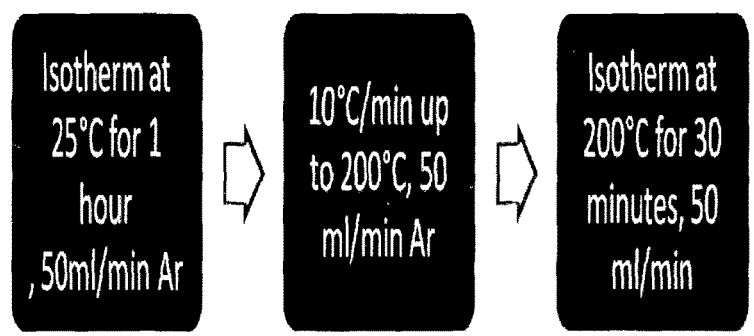
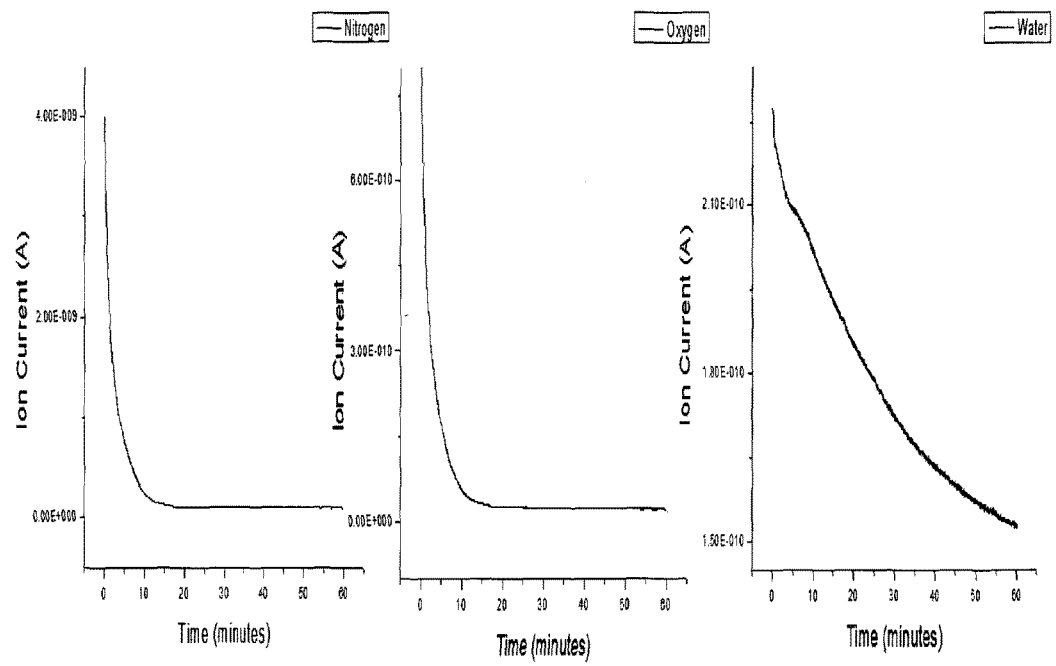
One hour is not enough to get rid of water

Summary

| PYR14TFSI | TEGDME | HFE | Viscosity(Pa.s) |
|---|---|---|---|
| 80% | 15% | 5% | 29.41 |
| 80% | 16% | 4% | 26.69 |
| 80% | 18% | 2% | 26.09 |
| DI Water | | | 0.94 |

IONIC LIQUID ELECTROLYTE AND FLUORINATED CARBON ELECTRODE

CROSS-REFERENCE TO RELATED APPLICATION

This application claims the benefit of priority of U.S. Provisional Patent Application No. 61/770,372, filed Feb. 28, 2013, the contents of which being hereby incorporated by reference in its entirety for all purposes.

TECHNICAL FIELD

The invention relates to an electrolyte for a metal air battery, and in particular, to an ionic liquid electrolyte for a metal air battery. The ionic liquid electrolyte includes an additive to improve oxygen solubility thereof.

BACKGROUND

Metal battery, such as a lithium air battery or more precisely called a lithium oxygen battery since the most widely investigated reactant is oxygen instead of air, is an attractive choice for future energy storage due to its high theoretical energy density of 7987 Wh/L, three times higher than the currently available lithium ion battery.

The reaction of interest on the cathode of the lithium oxygen battery is the reduction of oxygen, followed by reaction with lithium. Although the exact reaction mechanism is still under Investigation, recent experiments indicate that a two-step one electron electrochemical reaction might be the dominating process, and the formation of reduced oxygen occurs on the electrode surface instead of in the electrolyte solution. The proposed reaction scheme is described in Scheme 1 as follows. The * symbolizes the surface reactions.

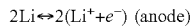

$2Li \leftrightarrow 2(Li^+ + e^-)$ (anode)

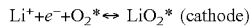

$Li^+ + e^- + O_2^* \leftrightarrow LiO_2^*$ (cathode)

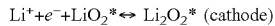

$Li^+ + e^- + LiO_2^* \leftrightarrow Li_2O_2^*$ (cathode)     Scheme 1

Judging by these proposed reactions, besides the availability of lithium ions, another factor that is necessary for the reactions to occur is the availability of oxygen in the cathode. Oxygen accessibility is governed by the diffusion of oxygen and the amount of dissolved oxygen in the system.

In the case of a metal air (or metal oxygen) battery, an electrolyte with a high amount of dissolved oxygen is therefore desirable.

SUMMARY

Fluorinated carbon compounds, such as perfluorocarbon, a main component in artificial blood, have the ability to absorb significant amounts of oxygen. Fluorinated carbon compounds are herein used in metal air batteries to enhance the performance of the metal air batteries by increasing the amount of dissolved oxygen at the cathode. Preliminary results show that the discharge voltage increases when present ionic liquid electrolyte includes fluorinated carbon compounds, such as perfluorocarbon, as additives.

Accordingly, in one aspect of the invention, there is provided an electrolyte for a metal air battery, including:
- a base solvent, wherein the base solvent is an ionic liquid;
- a bridging solvent, wherein the bridging solvent is an organic solvent;
- a fluorinated carbon compound; and
- a metal salt.

In another aspect of the invention, there is provided a method of impregnating a fluorinated carbon compound into an electrode. The method includes depositing onto the electrode a dispersion comprising the fluorinated carbon compound dissolved in an organic solvent and placing the electrode in an inert environment.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

FIG. 1 shows the oxygen solubility and viscosity of PYR14TFSI and HFE 7000.

FIG. 5 shows a scheme of reduction and oxidation reaction in the presence of lithium salts.

FIG. 10 shows materials employed in the fabrication of lithium oxygen cell of the comparative example.

FIG. 14 shows the electrolyte mixture of dimethoxyethane and perfluorocarbon liquid of the comparative example.

FIG. 15 shows air tight cells of comparative example utilized for XRD and Raman characterization.

FIG. 16 shows the material of air tight cells and leak test results of the comparative example.

FIG. 20 shows the BET surface area and pore volume measurement of graphitized acetylene black powder and 20 wt % PVDF electrode of the comparative example.

FIG. 22 shows the effect of thickness on discharge profile of lithium oxygen battery of the comparative example.

FIG. 23 shows the permeability of water and gases of several polymers used as possible washer in the EL-cell of the comparative example.

FIG. 28 shows the TGA-MS for the detection of PFC presence on impregnated cathode.

DESCRIPTION

Figure 2:
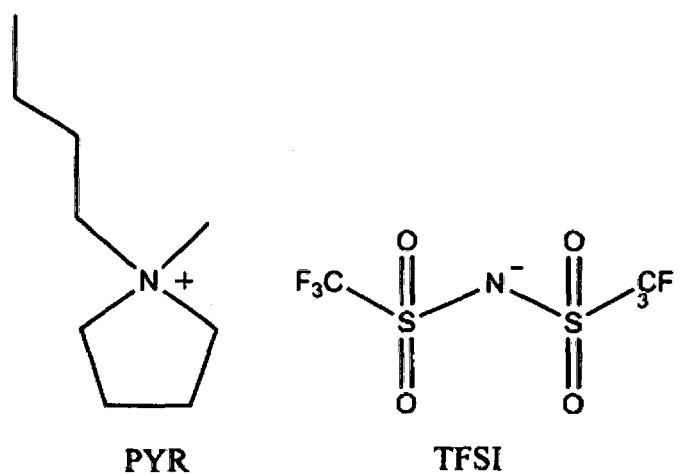
FIG. 2 shows PYR14 cation and TFSI anion.

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Further, the terms and phrases used herein generally have their art-recognized meaning, which may be found by reference to standard texts, journal references and contexts known to those skilled in the art. The following definitions are provided to clarify their specific use in the context of the invention.

The term "solvent" refers to a liquid that at least substantially or completely dissolves a solid, liquid, or gaseous solute, resulting in a solution. Liquid solvents can dissolve electron acceptors and electron donor metals in order to facilitate transfer of electrons from the electron donor metal to the electron acceptor.

The term "electrochemical cell" or "cell" refers to a device that converts chemical energy into electrical energy, or electrical energy into chemical energy. Generally, electrochemical cells have two or more electrodes and an electrolyte, wherein electrode reactions occurring at the electrode surfaces result in charge transfer processes. Examples of electrochemical cells include, but are not limited to, batteries and electrolysis systems.

The term "electrode" may refer to a "cathode" or an "anode". The terms "cathode" and "positive electrode" are used interchangeably, and refer to the electrode having the higher of electrode potential in an electrochemical cell (i.e. higher than the negative electrode). Conversely, the terms "anode" and "negative electrode", which are used interchangeably, refer to the electrode having the lower of electrode potential in an electrochemical cell' (i.e. lower-than the positive electrode). Cathodic reduction refers to a gain of electron(s) of a chemical species, and anodic oxidation refers to a loss of electron(s) of a chemical species.

"Electrode potential" refers to a voltage, usually measured against a reference electrode, due to the presence within or in contact with the electrode of chemical species at different oxidation (valence) states.

The term "electrolyte" refers to an ionic conductor which may be in a solid state, including in a gel form, or in a liquid state. Generally, electrolytes are present in the liquid state. Of particular interest in present disclosure are electrolytes including ionic liquids, which are generally salts in the liquid state.

The terms "charge" and "charging" refer to process of increasing electrochemical potential energy of an electrochemical cell, which may take place by replacement of or addition of depleted active electrochemical materials with new active compounds. The term "electrical charging" refers to process of increasing electrochemical potential energy of an electrochemical cell by providing electrical energy to the electrochemical cell.

The term "metal salt" refers to an ionic species which comprises a metal cation and one or more counter anions, such that the metal salt is charge neutral, for example, having a net charge of zero.

It will be understood that the terms "battery" and "cell" may be used interchangeable herein. A "battery" may consist of a single cell or of cells arrangement in series and in parallel to form a battery module or a battery pack. In present context, secondary batteries (i.e. rechargeable batteries) are of particular interest. For the purposes of illustration and brevity, it is also to be understood that while present disclosure has been described in detail with respect to lithium air batteries, the scope of the invention is not limited as such.

Ionic liquid is expected to be the future electrolyte for metal air batteries due to its high ionic conductivity, non flammability and low volatility. Its wide electrochemical stability window and enhanced hydrophobicity is anticipated to provide better protection to the anode. However, its high viscosity and lack of oxygen solubility are shortcomings that need to be overcome.

Accordingly, in one aspect of the invention, there is provided an electrolyte for a metal air battery.

The electrolyte includes a base solvent, wherein the base solvent is an ionic liquid. A base solvent generally refers to, a solvent that forms a significant portion of the resulting final solvent mixture.

In various embodiments, the ionic liquid may include a bis(trifluoromethanesulfone)imide (TFSI) anion. The chemical representation of TFSI anion is shown in FIG. 2.

In various embodiments, the ionic liquid may include a 1-methyl-1-butyl-pyrrolidinium (PYR) cation. The chemical representation of PYR cation is shown in FIG. 2.

In one embodiment, the ionic liquid includes 1-methyl-1-butyl-pyyrolidinium bis(trifluoromethanesulfone)imide ($PYR_{14}TFSI$).

Other suitable ionic liquids may include, but not limited to, 1-butyl-3-methylimidazolium trifluoroacetate, 1-butyl-1-methylpyrrolidinium trifluoroacetate, 1-butyl-2,3-dimethyl-imidazolium bis(trifluoromethylsulfonyl)imide, 1-butyl-3-methylimidazolium bis(trifluoromethylsulfonyl)imide, 1-butyl-2,3-dimethylimidazolium tetrafluoroborate, 1-butyl-3-methylimidazolium tetrafluoroborate, 1-butyl-3-methyl-imidazolium tetrafluoroborate, N-butyl-3-methylpyridinium tetrafluoroborate, 1-butyl-3-methylimidazolium dicyanamide, N-butyl-3-methylpyridinium dicyanamide, 1-butyl-1-methylpyrrolidinium dicyanamide, 1-ethyl-3-methylimidazolium thiocyanate, 1-benzyl-3-methylimidazo hum chloride, 1-butyl-3-methylimidazolium tricyanomethane, N-butyl-3-methylpyridinium dicyanamide, 1-butyl-1-methylpyrrolidinium dicyanamide, 1-ethyl-3-methylimidazolium hydrogensulfate, N-butyl-3-methylpyridinium hexafluorophosphate, 1-butyl-2,3-dimethylimidazolium hexafluorophosphate, 1-butyl-3-methylimidazolium methanesulfonate, N-butyl-3-methylpyridinium trifluoromethanesulfonate, 1-butyl-2,3-dimethylimidazolium trifluoromethanesulfonate, 1-butyl-3-methylimidazolium trifluoromethanesulfonate, 1-butyl-3-methylimidazolium trifluoromethanesulfonate, guanidinium trifluoromethanesulfonate, guanidinium tris(pentafluoroethyl)trifluorophosphate, 1-benzyl-3-methylimidazolium chloride, 1-butyl-3-methylimidazolium methanesulfonate, 1-butyl-2,3-dimethylimidazolium bis(trifluoromethylsulfonyl)imide, trihexyl(tetradecyl)phosphonium bis[oxalato(2-)]borate, trihexyl(tetradecyl)phosphonium bis(trifluoromethylsulfonyl)imide, trihexyl(tetradecyl)phosphonium tris(pentafluoroethyl)trifluorophosphate, N-butyl-3-methylpyridinium bromide, N-butyl-3-methylpyridinium hexafluorophosphate, N-butyl-3-methylpyridinium trifluoromethanesulfonate, 1-butyl-1-methylpyrrolidinium bromide, 1-butyl-1-methylpyrrolidinium bis[oxalato(2-)]borate, or 1-butyl-1-methylpyrrolidinium bis(trifluoromethylsulfonyl)imide.

The electrolyte further includes a fluorinated carbon compound (FC).

By "fluorinated" is meant that the (hydro)carbon compound contains one or more fluorine atom (F) replacing one or more hydrogen atom (H) in the (hydro)carbon compound. In present context, a fluorinated carbon compound may also be termed as a fluorocarbon. A "perfluorocarbon" or PFC refers to a completely fluorinated hydrocarbon. For example, the fluorinated carbon compound may include, but not limited to, 1-(difluoromethoxy)-1,1,2-trifluoroethane, 1-(difluoromethoxy)-1,2,2-trifluoroethane, 2-fluoromethoxy-1,1,1,2-tetrafluoroethane, 1-methoxy-1,1,2,2-tetrafluoroethane, 2-methoxy-1,1,1,2-tetrafluoroethane, 1-difluoromethoxy-2,-2-difluoroethane, 2-methoxy-1,1,2-trifluoroethane, 1,1-difluoro-2-methoxyethane, 1,1,2,2-tetrafluoro-3-(trifluoromethoxy)propane, 1-(2,2-difluoroethoxy)-1,1,2,2,2-pentafluoroethane, 3-(difluoromethoxy)-1,1,1,2,2-pentafluoropropane, 1,1,1,3,3,3-hexafluoro-2-(trifluoromethoxy)propane, 1,1,2-trifluoro-1-methoxy-2-(trifluoromethoxy)ethane, 1,1,2,3,3-hexafluoro-3-methoxypropane, 1,1,2,2,3,3-hexafluoro-3-methoxypropane, 1-(1,1,-difluoroethoxy)-1,1,2,2-tetrafluoroethane, 3-(difluoromethoxy)-1,1,2,2-tetrafluoropropane, 1,1,1,2,2-pentafluoro-3-methoxypropane, 2-(difluoromethoxy)-1,1,1-trifluoropropane, 2-ethoxy-1,1,1,2-tetrafluoroethane, 1,1,1-trifluoro-2-ethoxyethane, 1,1,1-trifluoro-3-methoxypropane, 1,1,1-trifluoro-2-methoxypropane, 1-ethoxy-1,2,2-trifluoroethane, 1,1,1,2,3,3-hexafluoro-3-(pentafluoroethoxy)propane, 2-ethoxy-1,1,1,2,3,3,3-heptafluoropropane, 3-ethoxy-1,1,1,2,2,3,3-heptafluoropropane, 1-(1,1,2,2-tetrafluoroethoxy)propane, 2,3-difluoro-4-(trifluoromethyl) oxetane, 1-ethoxy-1,1,2,2-tetrafluoroethane, or 1,1,1,2,2,3,3-heptafluoro-3-methoxypropane.

In various embodiments, the fluorinated carbon compound has a general formula R1-($C_nF_{2n}$)—R2, wherein each of R1 and R2 is independently F, H, $C_1$-$C_5$ alkyl, $C_1$-$C_5$ alkoxy, or $C_nF_{2p+1}$, $1 \leq n \leq 20$, and $1 \leq p \leq 20$.

For example, n may be 1, 2, 3, 4, 5, 6, 7, 8, 9, 10, 11, 12, 13, 14, 15, 16, 17, 18, 19, or 20.

In certain embodiments, $1 \leq n \leq 10$, such as n is 3.

For example, p may be 1, 2, 3, 4, 5, 6, 7, 8, 9, 10, 11, 12, 13, 14, 15, 16, 17, 18, 19, or 20.

In certain embodiments, $1 \leq n \leq 10$.

According to various embodiments, at least one of R1 and R2 is F. In the case where both R1 and R2 are F, then the fluorinated carbon carbon is a PFC as defined above.

In alternative embodiments, at least one of R1 and R2 is $C_1$-$C_5$ alkyl or $C_1$-$C_5$ alkoxy.

The term "alkyl", alone or in combination, refers to a fully saturated aliphatic hydrocarbon. In certain embodiments, alkyls are optionally substituted. In certain embodiments, an alkyl comprises 1 to 5 carbon atoms, wherein (whenever it appears herein in any of the definitions given below) a numerical range, such as "1 to 5" or "$C_1$-$C_5$", refers to each integer in the given range, e.g. "$C_1$-$C_5$ alkyl" means that an alkyl group comprising only 1 carbon atom, 2 carbon atoms, 3 carbon atoms, 4 carbon atoms, or 4 carbon atoms. Examples of alkyl groups include, but are not limited to, methyl, ethyl, n-propyl, isopropyl, n-butyl, n-pentyl.

The term "alkoxy", alone or in combination, refers to an aliphatic hydrocarbon having an alkyl-O— moiety. In certain embodiments, alkoxy groups are optionally substituted. Examples of alkoxy groups include, but are not limited to, methoxy, ethoxy, propoxy, butoxy and the like.

In certain embodiments, electrolyte includes a fluorinated carbon compound wherein n is 3, R1 is F and R2 is $C_1$-$C_5$ oxyalkyl.

For example, the fluorinated carbon compound may have the formula $CF_3CF_2CF_2OCH_3$ (1-methoxyheptafluoropropane).

The electrolyte further includes a bridging solvent, wherein the bridging solvent is an organic solvent. Generally the fluorinated carbon compound is totally or partially immiscible in the base solvent. Accordingly, a bridging solvent is added to the base solvent to improve the solubility of the fluorinated carbon compound in the base solvent.

In various embodiments, the bridging solvent may include an ether.

For example, the bridging solvent may be 1,2-dimethoxyethane (DME, $CH_3OCH_2CH_2OCH_3$) or tetraethyleneglycol dimethyl ether (TEGDME, $CH_3O(CH_2CH_2O)_4CH_3$). Further examples include, but are not limited to, diisopropyl ether, 1,4-dioxane, 1,3-dioxolane, 2-methyltetrahydrofuran, tetrahydrofuran, tetrahydropyran, diethyl ether, diglyme, or triglyme.

The electrolyte further includes a metal salt.

In various embodiments, the metal salt may include a salt of a metal selected from the group consisting of an alkali metal, an alkali-earth metal and a lanthanide metal.

For example, the metal salt may be a lithium salt, such as $LiClO_4$ (lithium perchlorate), $LiPF_6$ (lithium hexafluorophosphate), lithium bis(trifluorosulfonyl)imide (LiTFSI), or lithium bis(fluorosulfonyl)imide (LiFSI).

Further examples of lithium salts may include, but are not limited to, LiBr, $LiAsF_6$, $LiAlCl_4$, $LiBF_4$, $LiCF_3SO_3$, $LiN(SO_2CF_3)_2$, or $LiC(SO_2CF_3)_3$.

In one specific embodiment, the electrolyte may include $PYR_{14}TFSI$, 1-methoxyheptafluoropropane, 1,2-dimethoxyethane, and $LiClO_4$.

In another aspect of the invention, a metal air battery including an electrolyte presently disclosed herein is provided.

The metal air battery may further include an anode, such as a metallic lithium anode.

The metal air battery may further include a cathode, such as a graphitized acetylene black cathode.

In another aspect of the invention, there is provided a method of impregnating a fluorinated carbon compound into an electrode. The method includes depositing onto the electrode a dispersion comprising the fluorinated carbon compound dissolved in an organic solvent.

The fluorinated carbon compound may be one as described above.

The organic solvent may be a bridging solvent as described above.

The fluorinated carbon compound may be deposited in a dropwise manner until a predetermined amount is achieved. The thus-deposited electrode may then be placed in an inert environment, such as in an argon environment. The inert environment may be sufficiently low in humidity such that the dispersion of the fluorinated carbon compound dissolved in the organic solvent is sufficiently absorbed or impregnated in the electrode.

In order that the invention may be readily understood and put into practical effect, particular embodiments will now be described by way of the following non-limiting examples.

EXAMPLES

Example 1

In this example, fluorinated carbons (FC), such as 1-methoxyheptafluoropropane (HFE 7000) (3M, 99.5%) are used as additives for the ionic liquid electrolyte, to decrease the viscosity and increase oxygen solubility. FIG. 1 shows the oxygen solubility and viscosity of PYR14TFSI and HFE 7000. Bridging solvents such as organic solvent 1,2-dimethoxyethane (DME) (anhydrous, Sigma Aldrich) is incorporated to assist the dissolution of the FC in ionic liquid. The steps taken to develop a hybrid ether-based electrolyte with ionic liquid includes selection of ionic liquid, investigation of the oxygen reduction reaction in ionic liquid-DME-FC-lithium salt, and subsequent testing in an ECC-air cell. The lithium salt used is lithium perchlorate (LiClO$_4$) (anhydrous, Sigma Aldrich). The anode is metallic lithium. The cathode is graphitized acetylene black with 20 wt % PVDF binder.

Selection of Ionic Liquid

Figure 3:
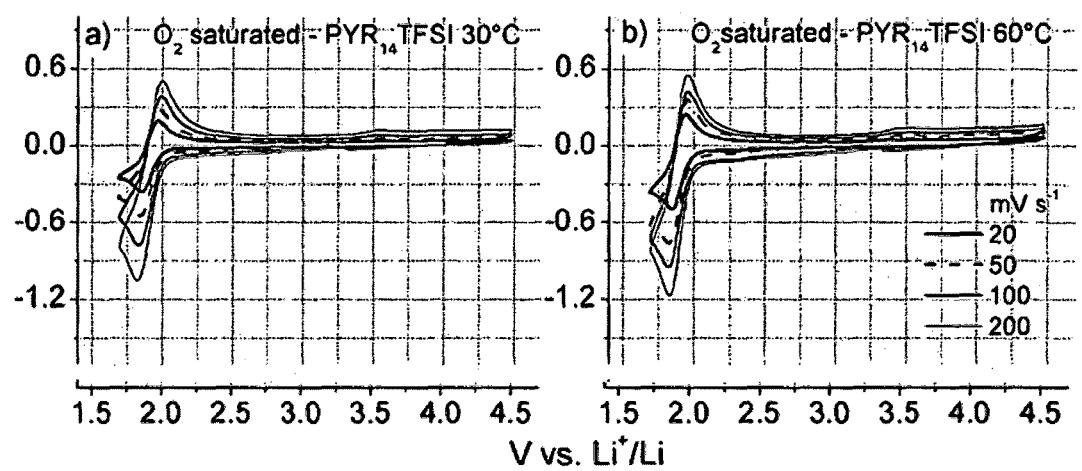
FIG. 3 shows oxygen redox reaction in PYR14TFSI at (a) 30° C. and (b) 60° C.

Ionic liquids with the bis(trifluoromethanesulfone)imide (TFSI) anion are an attractive choice for the lithium oxygen battery electrolyte, due to their wide electrochemical stability window, stability against moisture, and hydrophobicity. Their water solubility is lower compared with other anions such as $BF_4^-$, $PF_6^-$, and $CF_3SO_3^-$. The cation of ionic liquid seems to largely affect the oxygen reduction reaction and its discharge product. The formation of the oxygen superoxide ion is stable in aliphatic trimethyl-n-hexylammonium TMHATFSI and alicyclic 1-butyl-1-methylpyrrolidinium BMPTFSI (PYR14TFSI), and unstable in aromatic 1-ethyl-3-methylimidazolium EMITFSI and 1,2-dimethyl-3-propylimidazolium DMPITFSI marked by a low $i_c/i_a$ (cathodic and anodic current) ratio. A recent study shows that a pyrrolidinium-based ionic liquid could be a promising candidate for the lithium oxygen battery electrolyte. 1-methyl-1-butyl-pyrrolidinium bis(trifluoromethanesulfone) (PYR14TFSI) (alfa aesar, 99%), whose anion and cation are displayed in FIG. 2, has a wide stability window of 5.5 V from 0.6 V to 6 V vs Li/Li$^+$. The oxygen reduction follows a quasi-reversible one electron process as depicted in FIG. 3. In present example, PYR14TFSI is utilized as an electrolyte for the lithium oxygen battery to demonstrate the concept for the effect of FC additives.

Figure 4:
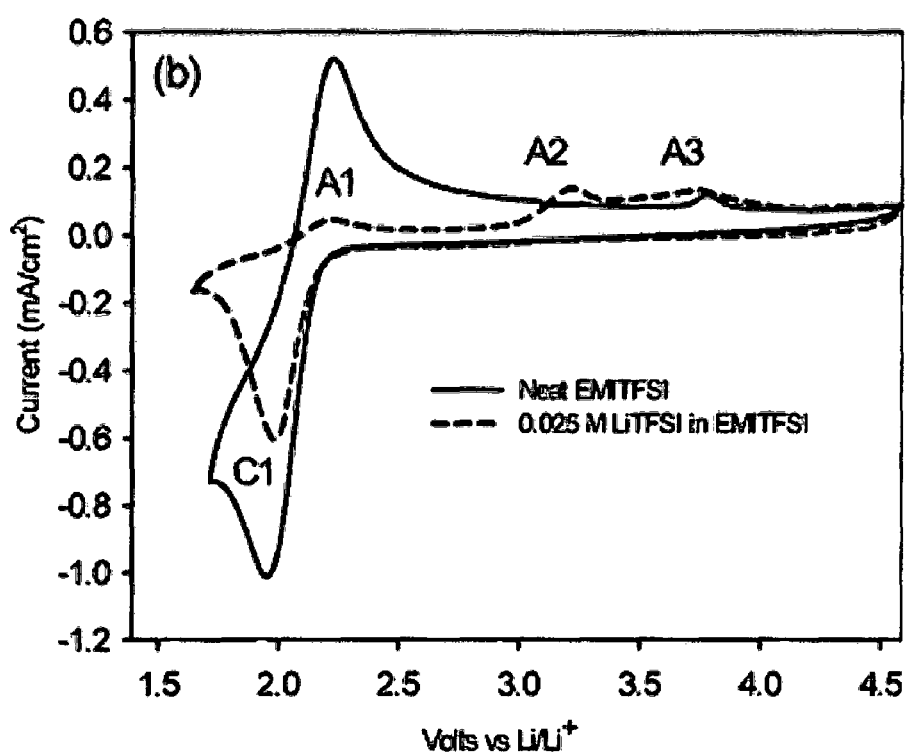
FIG. 4 shows CV of EMITFSI with and without 0.025M LiTFSI salt.
Figure 6:
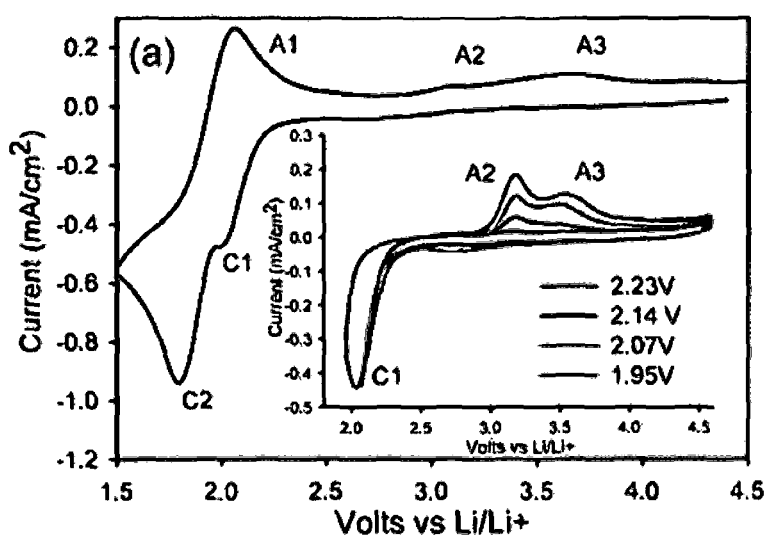
FIG. 6 shows CV of PYR14TFSI with 0.025M LiTFSI salt.

Investigating the Mechanism of Oxygen Reduction in Ionic Liquid with Addition of Lithium Salts and DME and FC Additives The effect of lithium salt (LiTFSI) on the EMITFSI and PYRTFSI has been studied, and concluded that the O$_2$ reduction and evolution reactions follow different mechanisms in the presence of lithium salt. The reactions followed an altered path where lithium reacts with superoxide and gets oxidized at various anodic peaks (FIG. 4). Meanwhile, for the electrolyte without lithium salt, the formation of the EMI-O$_2$ complex is deduced in reduction and EMI-O$_2$ oxidation occurs on oxidation. The reaction scheme is described in FIG. 5. For PYR14TFSI, the same phenomenon of LiO$_2$ and Li$_2$O$_2$ formation was also observed (FIG. 6).

1,2-dimethoxyethane (DME) is mixed with PYR14TFSI as a solvent bridge, since FC is immiscible with PYRI14TFSI and may prohibit the homogeneous mixture of the electrolyte. Another alternative is making ionic liquid-FC dispersion using sonication. Nevertheless, no electrochemistry study of the oxygen redox reaction in PYR14TFSI mixed with 1,2-dimethoxyethane has been reported yet, which makes it an interesting path to explore. Fabrication of the lithium oxygen battery with the PYR14TFSI-TEGDME-LiCF$_3$SO$_3$ electrolyte has been reported, observing better performance compared with the TEGDME-LiCF$_3$SO$_3$ electrolyte in terms of discharge and charge potential. Blending of the DME could increase the oxygen solubility and reduce the ionic liquid viscosity as well.

Figure 7:
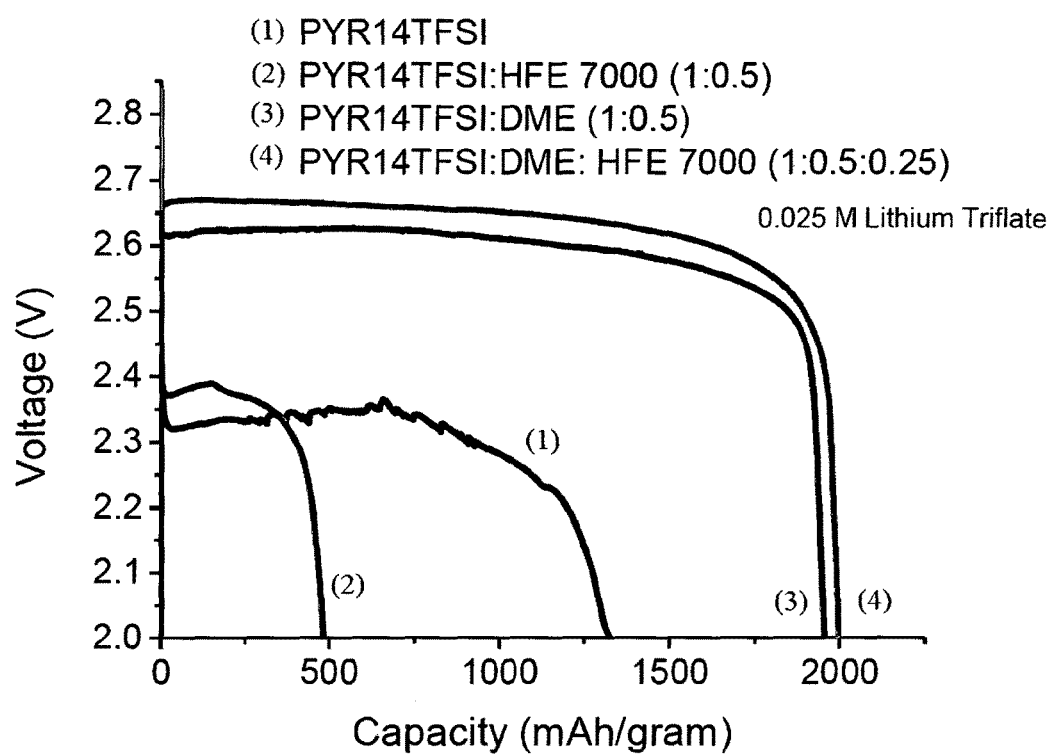
FIG. 7 shows the effect of FC and $DM_E$ additives on 0.025 M LiTFSI:PYR14TFSI toward discharge performance of lithium oxygen battery.

The recent preliminary result shows enhanced capacity and discharge voltage at 25 mA/gram for lithium oxygen cells with electrolyte of 0.025 M lithium triflate PYRI14TFSI when it is mixed with 1,2-dimethoxyethane (FIG. 7). Addition of HEF 7000 to the ionic liquid and DME mixture increases the discharge potential of about 67 mV. Meanwhile, the sonicated PYR14TFSI with FIFE 7000 solvent resulted in a miscible solution. However, the performance was inferior to that of pure PYR14TFSI. This could be attributed to the reaction of PYR14TFSI with HFE 7000 upon sonication, or a lack of electrolyte optimization. Addition of HFE 7000 PYR14TFSI and DME mixture was found to decrease the discharge overpotential, consistent with the previous observations.

Investigation of the Effect of Oxygen on the Lithium Oxygen Battery

The effect of the amount of oxygen or pressure on the thermodynamics and kinetics of the cathode reaction is one of the important questions that need to be addressed, in order to understand the effect and necessity of utilizing perfluorocarbon that is expected to increase the dissolved oxygen content inside the lithium oxygen cell.

Figure 8:
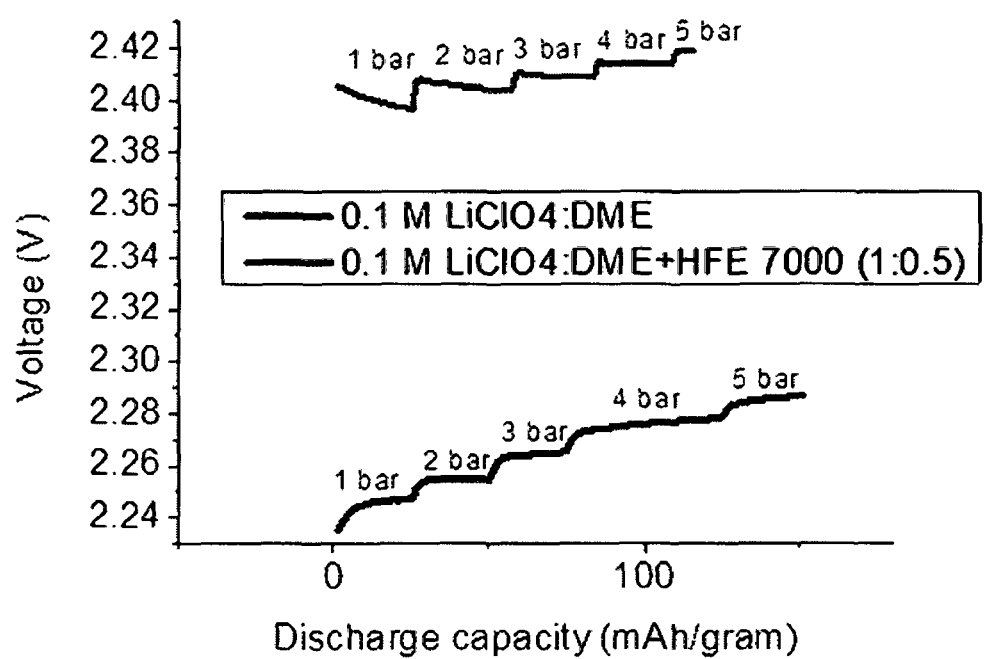
FIG. 8 shows discharge profile at 500 mA/gram for the cell with and without FC additives.
Figure 9:
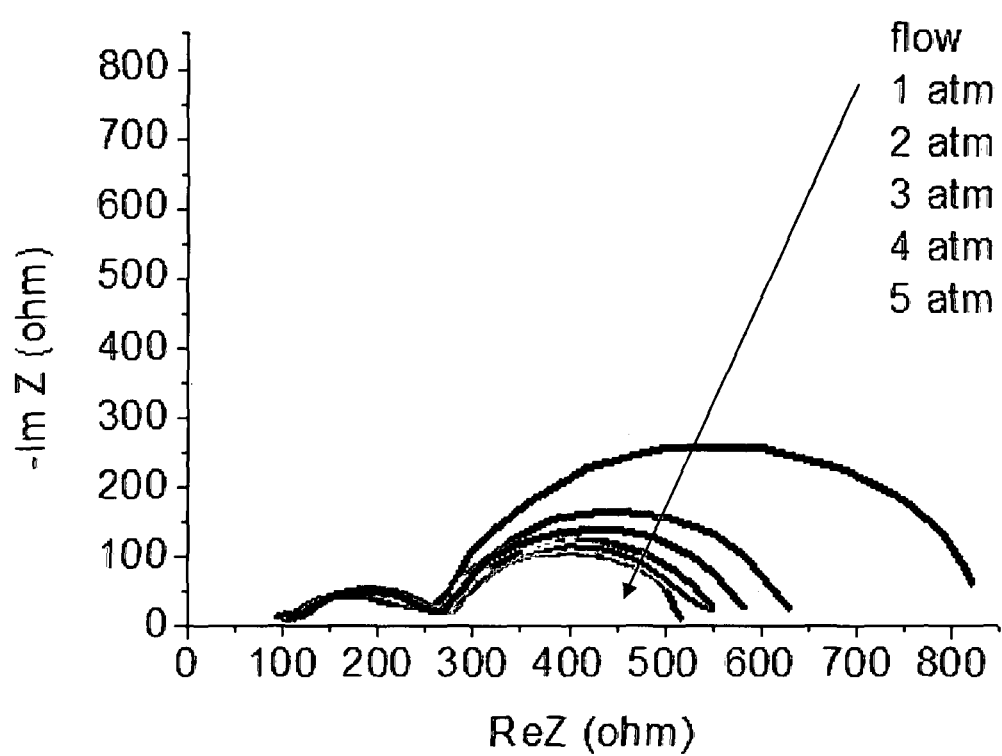
FIG. 9 shows the decreasing charge transfer resistance with increase of pressure.

The preliminary result of discharging lithium oxygen batteries with 0.1 M LiClO$_4$: DME and with HFE additive at different pressure shows increasing voltage plateau with increase of oxygen pressure (FIG. 8). The voltage plateau for the cell with HFE additive shows a higher discharge voltage. The result is consistent with the impedance data which shows decreasing charge transfer resistance with increase of pressure (FIG. 9).

This finding affirms the necessity of adding fluorocarbon additives since the mass transport of oxygen is one of the limiting factor in lithium oxygen battery performance.

Comparative Example

Materials and Setup: A lithium oxygen cell consists of an air electrode, separator, electrolyte and lithium metal anode.

The materials involved in the fabrication are listed in FIG. 10.

Figure 11:
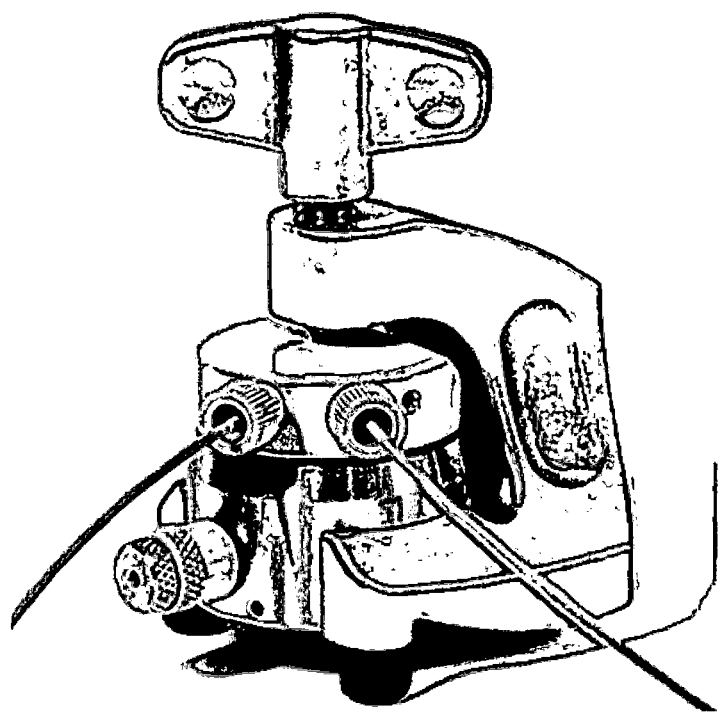
FIG. 11 shows an ECC-air cell of comparative example.
Figure 12:
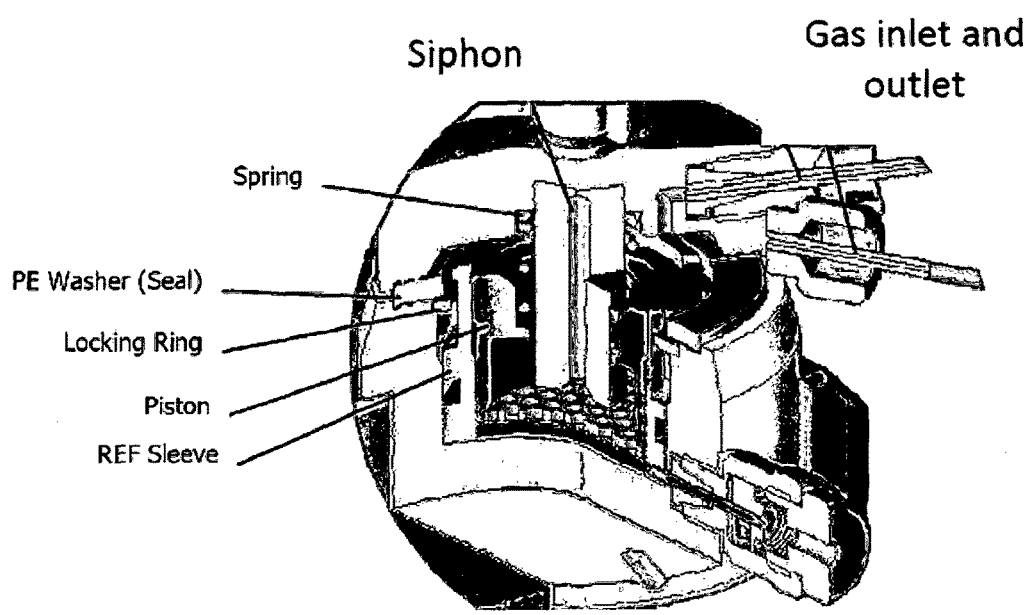
FIG. 12 shows the component inside the ECC-air cell of FIG. 11.

The assembly of the cell was performed in an Argon environment glovebox that has less than 1 ppm of O$_2$ and 0.5 ppm of water. All the experiments were conducted in ECC-Air (FIG. 11), a test cell for electrochemical characterization of gas diffusion layers in aprotic electrolytes, made by EL-Cell-GmbH. FIG. 12 shows the stacking of the cell contents inside the cell. The cell was sealed with a homogeneous pressure of 6.9 Nm using a torque meter. During the experiment, the cell was connected with various gases for testing, i.e. argon and oxygen, using a flow meter with 0.05 ml/min flow.

Figure 13:
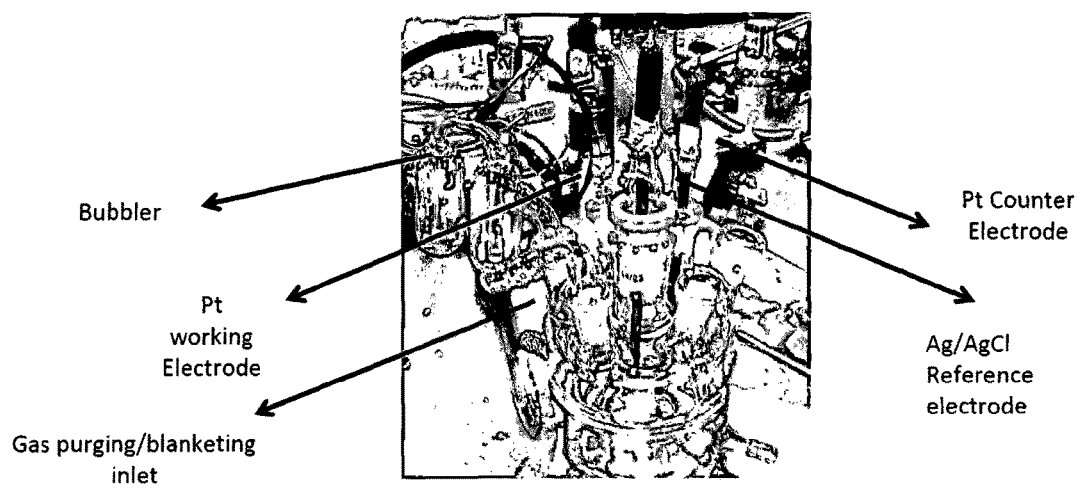
FIG. 13 shows a three-electrode cell of the comparative example.

A three-electrodes cell was also utilized in the study of the electrolyte (FIG. 13). It consists of an Ag/AgCl reference electrode, platinum wire as the counter electrode and a platinum disk as the working electrode. The gas purging and blanketing connection were attached to the cell and a temperature controller (Julabo) was utilized to keep the temperature constant during the experiment.

Experimental Procedures

Cathode fabrication: PVDF-HSV 900 was predried at 60° C. in vacuum and then dissolved in NMP until it reached 6 wt % PVDF in NMP. 240 mg of carbon material was mixed with the binder solution in the proportion of 20 wt % binder and 3 ml of NMP was added to the mixture. A Heidolph homogenizer was employed, at the speed of 15000 rpm for 5 minutes. The slurry was sonicated using a UP200S Ultrasonic Processor from Hielscher with 50% intensity and 0.5 cycles for 30 seconds. A Celgard monolayer polyethylene was prepared on top of the Doctor Blade coater to be covered by the slurry. The micrometer thick carbon coating was punched to a 14 mm diameter and weighed with a microbalance (Metier Toledo) with a resolution of 0.001 mg. The cathode disk was dried at 90° C. for 12 hours inside a vacuum-sealed portable oven from Buchi, before being transferred to the glovebox. The typical range of electrodes fabricated was 1.5-1.6 mg, with a carbon loading of 0.97-1.03 mg/cm$^2$ and thickness of 20 μm.

Electrolyte Preparation: The solvents used were dried with an activated 4 Å molecular sieve, and the salts were pre-dried at 50° C. for 24 hours. Different electrolyte mixtures were prepared by employing overnight stirring at 300 rpm. The mixtures' water contents were tested with Karl Fischer titration equipment by Mettler Toledo, and all were below 60 ppm. The oxygen solubility concentration calculation was attached in the appendix. FIG. 14 shows the typical electrolyte mixture.

Electrochemical Characterization: Electrochemical characterization was performed using an Arbin Battery tester BT2000 with a voltage range of −5 V to 5 V and accuracy of 0.05%. The current range used was between −10 mA and 10 mA. Several experiments were conducted, including constant current (charge and discharge), constant voltage, and cyclic voltammetry.

Physical Characterization: Quantachrome gas sorption was utilized to measure the surface area and pore volume of the carbon cathode. The discharge product's chemical properties were investigated using X-ray diffraction, Raman Spectroscopy, and Fourier Transform IR. A Field Emission Scanning Electron Microscope was employed to study the morphology of the resulting discharge product. Air-tight cells were utilized for the XRD and Raman Spectroscopy analysis due to the reaction of the discharged product $Li_2O_2$ to LiOH upon exposure to air. FIG. 15 shows a picture of the air tight cells utilized for the XRD and Raman characterization, and FIG. 16 describes the materials used and their leak test results.

Figure 17:
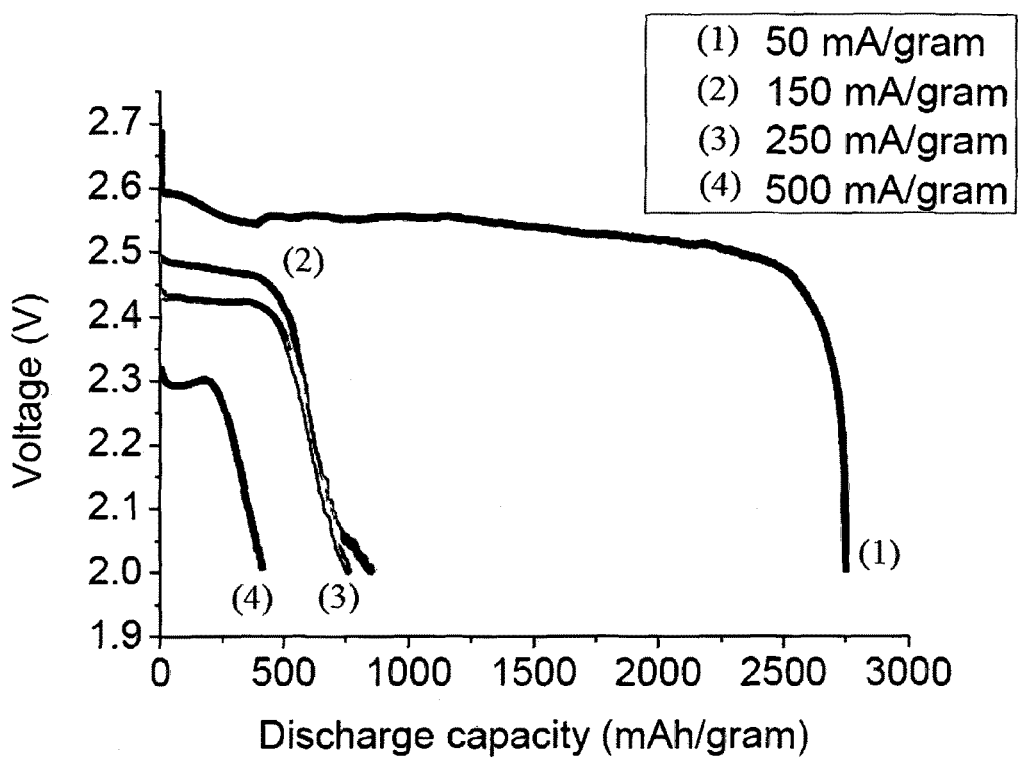
FIG. 17 shows the discharge profile of lithium oxygen cell of the comparative example at different rates.

Testing of lithium oxygen battery: FIG. 17 shows the discharge profiles of the lithium oxygen battery with the graphitized acetylene black cathode and 0.1 M LiClO4: DME at different current rates.

Figure 18:
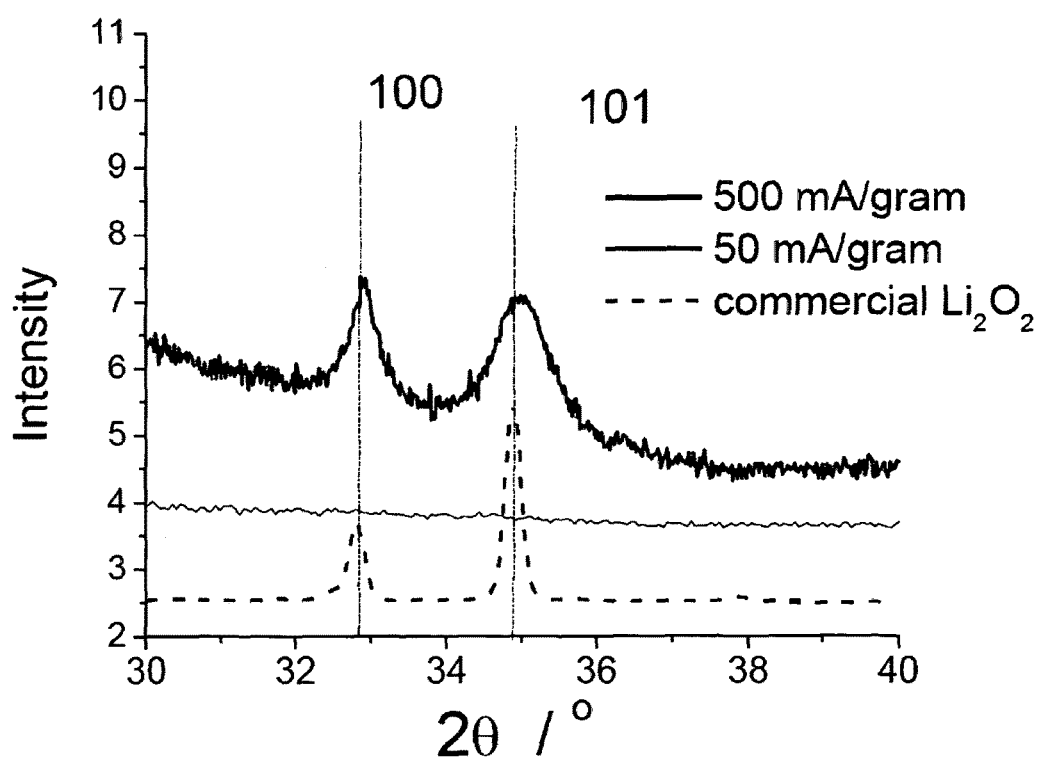
FIG. 18 shows the XRD spectra of lithium oxygen cell of the comparative example discharged at 50 mA/gram and 500 mA/gram.
Figure 19:
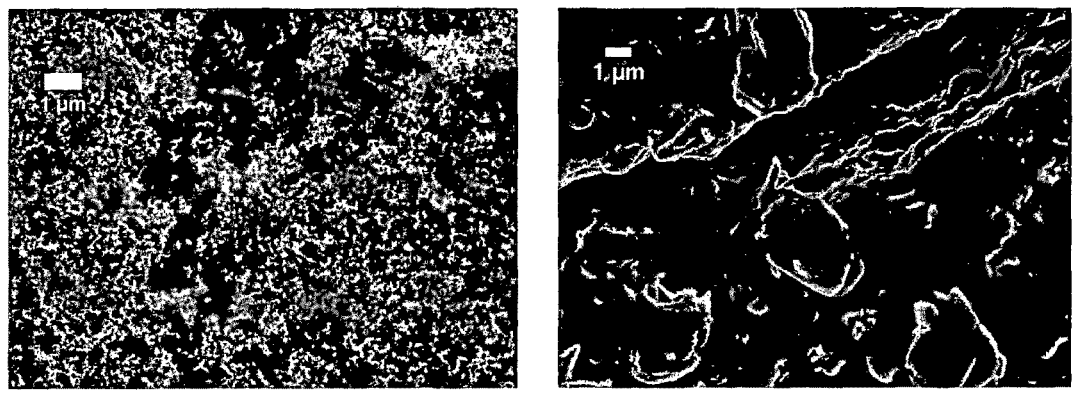
FIG. 19 shows a typical FESEM image taken before discharge and after discharge at low current of the comparative example.

There is a trend of decreasing voltage as well as capacity as we increase the discharge rate of the lithium oxygen battery. At a low discharge rate that yields a high capacity of 2750 mAh/gram, the end-of-discharge mechanism of the cell could be attributed to the formation of $Li_2O_2$, which blocked the pores of the carbon electrode. The formation of the $Li_2O_2$ is supported by XRD data, with two peaks appearing at 2θ of 33° and 35°, as indicated in FIG. 18. The blocking of the discharged product is confirmed by a FESEM observation on the surface of the discharge product at several spots, and one example is shown in FIG. 19.

The calculation of the amount of discharged product formed supports the possibility of pore blockage on the carbon electrode. FIG. 20 shows the BET surface area and pore volume of the graphitized acetylene black carbon in powder and electrode form. The molecular weight of $Li_2O_2$ is 45.88 g/mol with a density of 2.31 g/cm$^3$. The weight of each carbon electrode is 2.5 milligrams, and thus the available pores in the electrode are $1 \times 10^{-3}$ cm$^3$. Assuming the capacity after discharge at low rate to be ~2500 mAh/gram, the amount of discharged product formed was 5.36 mg. If the entire discharged product grows on the pores of the electrode, the volume of the discharged product is equivalent to $2.32 \times 10^{-3}$ cm$^3$ (two times the pore volume), which could lead to the possibility of pore filling and blockage by the discharge product formation.

At a higher discharge rate, the end-of-discharge mechanism is suspected to be dissimilar to that of at low discharge rate. The XRD diffraction pattern at a cathode discharged at 500 mA/gram shows a flat pattern and was not able to detect the discharge product at a higher discharge rate, which could be explained by amorphous or defective discharge product formation. Another reason is smaller amount of $Li_2O_2$ formed due to smaller discharge capacity. Therefore, the discharge product's chemical composition that formed at a high discharge rate was not conclusive when analyzed using XRD. Further optimization on the XRD measurement parameters will be performed.

Figure 21:
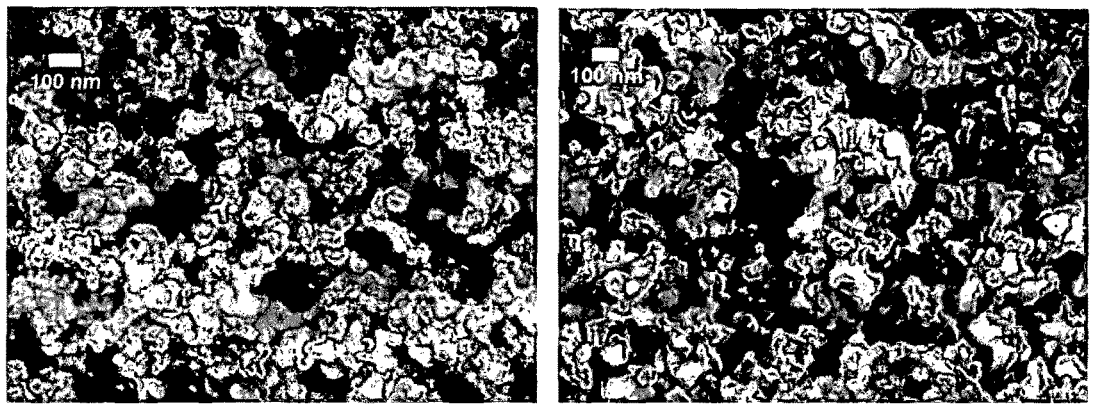
FIG. 21 shows the FESEM image taken before discharge and after discharge at 500 mA/gram of the comparative example.

The FESEM picture shows the different morphology of the discharged product at higher rates, and there is no physical cathode blocking on the cathode that faces the oxygen side, as indicated in FIG. 21. There was also higher data scattering when the cell was discharged at a higher discharge rate. This could be attributed to variation of the cathode fabrication, which will be explained in a later section, the different morphology of the formed discharge product that affected the subsequent growth, and a chemically different discharge product formed besides $Li_2O_2$ from the side reactions such as $Li_2CO_3$.

Several attempts have been made to control engineering variations from the battery fabrication. One important factor that affects the reproducibility of the result is the thickness of the electrode. FIG. 22 shows the effect of electrode thickness on the reproducibility of the discharged cell. Better reproducibility of the thinner electrode, as well as higher capacity, may be attributed to the shorter path travelled by both the Li+ and $O_2$, compared with the path of the thicker electrode.

Another factor that influences the performance of the lithium oxygen battery is the presence of moisture in the system. Water increases the discharge capacity of the lithium oxygen battery. In response to this finding, the polymer washer that was used for the cell sealing was changed from polyethylene to Kel-F due to the low water and oxygen permeability of the latter. FIG. 23 shows the properties of some candidate materials that have been considered.

Figure 24:
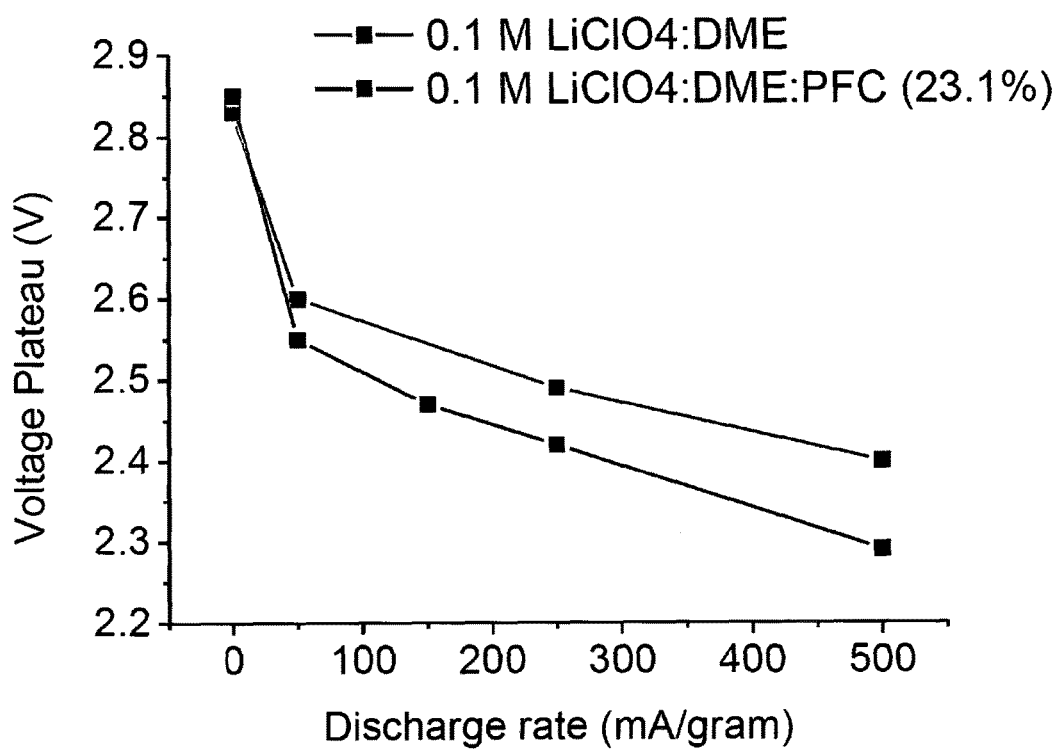
FIG. 24 shows the effect of FC additions at different rates described in the comparative example.

Effect of FC additives on the lithium oxygen battery performance: The decrease of the voltage with increase of the current rate could be caused, by the lack of dissolved oxygen in the catholyte to cope with the drawn current at a higher rate. Therefore, FC, which is well known for high oxygen solubility, was employed to investigate whether oxygen concentration is a ruling factor. The preliminary result shows that the addition of FC, in this case 23.1 volume % HFE 7000, increases the discharge voltage plateau at all rates (FIG. 24). The reduction of overpotential seems to increase at a higher current rate, 60 mV at 50 mA/gram, 80 mV at 250 mA/gram and 110 mV at 500 mA/gram. Application of Nerst equation, assuming the overpotential from ohmic drop is the same for cells with and without FC yield oxygen partial pressure increase of 10 folds, 22 folds and 73 folds respectively. However, as explained in the previous section, discharge processes at high rates might be complicated by side reactions. Therefore, the effect of FC concentration was first investigated at low rates of 50 mA/gram.

Figure 25:
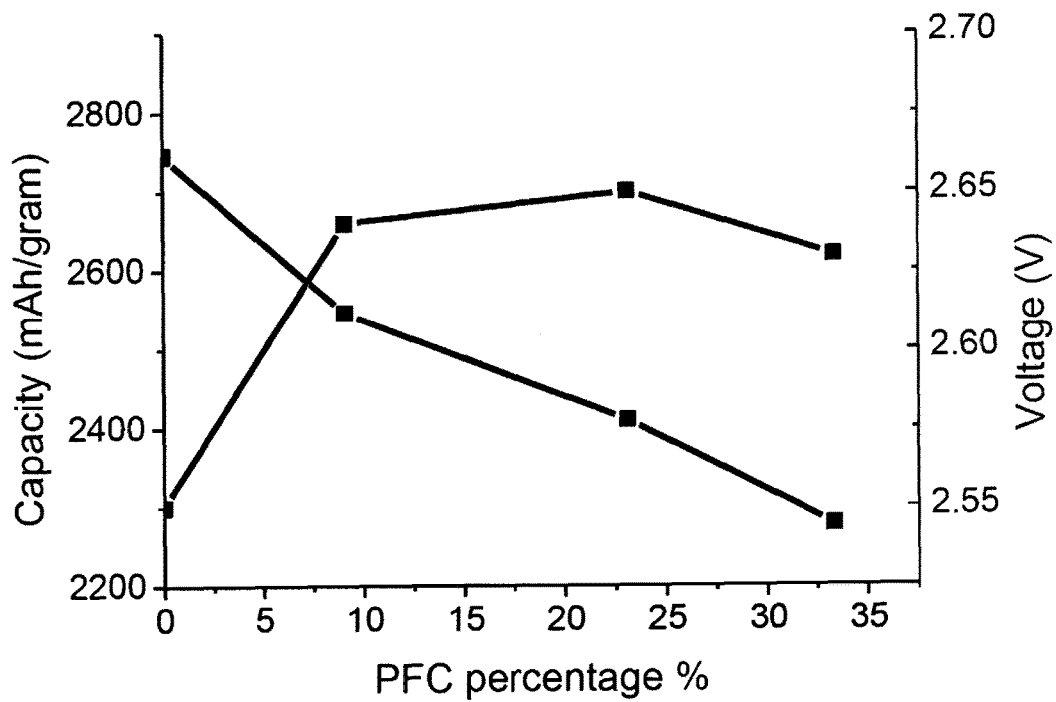
FIG. 25 shows the effect of FC concentration on discharge capacity and voltage at discharge rate of 50 mA/gram described in the comparative example.

FIG. 25 shows that there is an increase in the discharge voltage upon addition of HFE from 2.55 V to 2.64 V (voltage taken in steady state region at a discharge capacity of 500 mAh/gram). However the subsequent effect of HFE concentration on discharge voltage is not obvious. A satisfactorily substantial increase in the discharge voltage might be caused by an increase in oxygen content and diffusion in the electrolyte.

The discharge capacity shows a decreasing trend after the addition of HFE. This trend is not justified either by the lower viscosity or the higher dielectric constant of HFE 7000, compared with those of 1,2-dimethoxyethane. It is suspected that FC molecules might block the surface of carbon as described in step 5 below, thus leading to less active sites for reactions. Further characterization of the discharged product and electrolyte will be performed to understand the finding.

The possible mechanism for the formation of $Li_2O_2$ from the pure oxygen gas phase to the catholyte is described step by step as follows:

Step 1: Oxygen Dissolution in Catholyte
Reaction: $O_{2(gas)} \leftrightarrow O_{2(s)}$
Governing equation: $[O_2]_{(s)} = k_H P_{O2(atmosphere)}$
Where $[O_2]_s$=Concentration of $O_2$ in, catholyte, $PO_2$=Partial pressure of $O_2$, $k_H$=Henry's constant.

Step 2: Oxygen Van Der Walls Complex Formation with PFC and DME
Reaction: $[O_2, PFC]_{n(s)}$
Governing Equation:

$$k_{1a} = \frac{[O2, PFC]n(s)}{[O2][PFC]^n}$$

Reaction: $O_{2(s)} + nDME \leftrightarrow [O_2, DME]_{n(s)}$
Governing equation:

$$k_{1b} = \frac{[O2, DME]n(s)}{[O2][DME]^n}$$

Step 3: Diffusion of oxygen complex in the catholyte to the surface of the cathode $$J_1 = -\frac{D_1 \partial C_1}{\partial x} \quad \frac{\partial C}{\partial t_1} = \frac{D_1 \partial^2 C_1}{\partial x^2}$$

$$J_2 = -\frac{D_2 \partial C_2}{\partial x} \quad \frac{\partial C}{\partial t_2} = \frac{D_2 \partial^2 C_2}{\partial x^2}$$

J = flux (mol/m²s)
D = diffusion coefficient of oxygen complex (m²/s)
C = concentration (mol/m³)
x = position (m)
1 = in DME solvent, 2 = in PFC solvent Step 4: Oxygen complex adsorption on the surface of the carbon
Reaction: $[O_2, PFC]_{n(s)} + [O_2, DME]_{n(s)} + Carbon \leftrightarrow [O_2, PFC]_{n(ads)} + [O_2, DME]_{n(ads)}$
Governing Equation:

$$k_2 = \frac{\theta_{PFC} + \theta_{DME}}{(1 - \theta_{PFC} - \theta_{DME})P}$$

Θ = surface coverage
P = concentration of dissolved $O_2$ in PFC and DME

Step 5: Oxygen decomplexation
Reaction: $[O_2, PFC]_{n(ads)} \leftrightarrow O_{2(ads)} + nPFC_{(ads)}$
Governing equation:

$$k_3 = \frac{[O2][PFC]^n}{[O2, PFC]n}$$

Reaction: $[O_2, DME]_{n(ads)} \leftrightarrow O_{2(ads)} + nDME_{(ads)}$
Governing equation:

$$k_4 = \frac{[O2][DME]^n}{[O2, DME]n}$$

Figure 26:
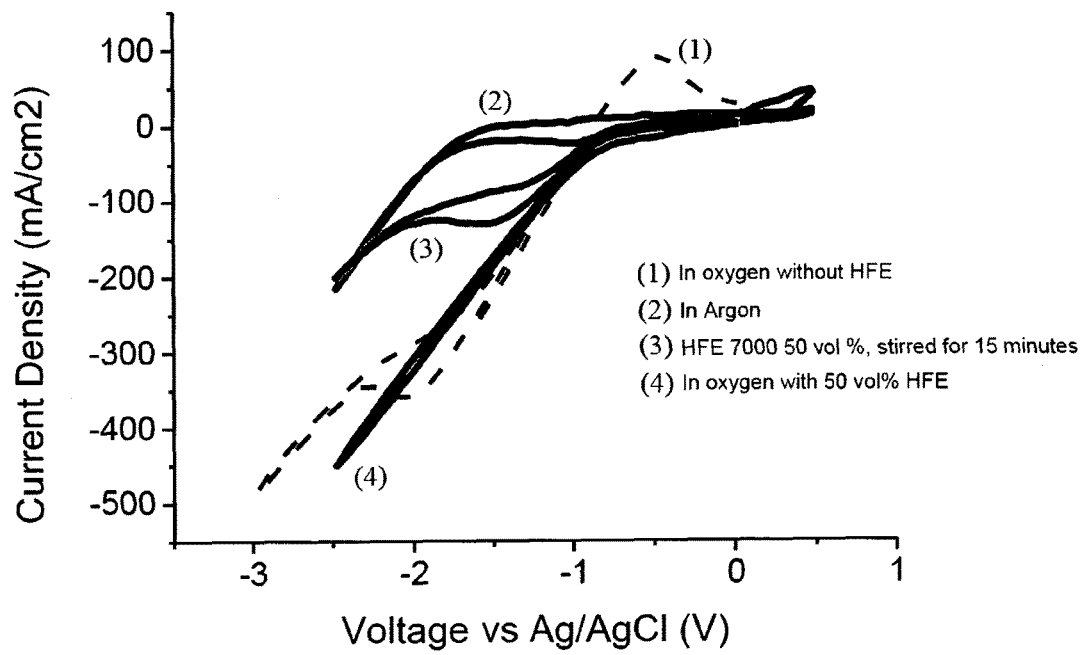
FIG. 26 shows the CV profile showing ability of $O_2$ to transfer between HFE 7000 and DME of the comparative example.

Step 6: Two Steps One Electron Oxygen Reduction
Reaction: $O_{2(ads)} + e^- \rightarrow O^-_{2(ads)}$
Governing equation: $v_1 = k_{11}[O_2]_{(ads)} - k_{12}[O_2^-]_{(ads)}$
Reaction: $Li^+_{(ads)} + O^-_{2(ads)} \rightarrow LiO_{2(ads)}$
Governing equation: $k_5 = [LiO_2]_{(ads)} / [Li^+]_{(ads)} [O_2^-]_{(ads)}$
Reaction: $LiO_2 + Li^+ + e^- \rightarrow Li_2O_{2(ads)}$
Governing equation: $v_2 = k_{21}[LiO_2]_{(ads)}[Li^+]_{(ads)} - k_{22}(Li_2O_2)_{(ads)}$ Step 7: Possible reactions involving $Li_2O_2$
$Li_2O_2$ crystallization
Reaction: $nLi_2O_{2(ads)} \leftrightarrow (Li_2O_2)_{n(ads)}$
Governing equation: $k_{crystallization} = [Li_2O_2]_{n(ads)} / [Li_2O_2]^n_{(ads)}$
$Li_2O$ Crystal Dissolution
Reaction: $(Li_2O_2)_{(n)} \leftrightarrow (Li_2O_2)_{(s)}$
Governing equation: $k_{dissolution} = [Li_2O_2]_{(s)} / [Li_2O_2]_{(n)}$
$Li_2O_2$ Dissociation
Reaction: $[Li_2O_2]_{(s)} \leftrightarrow 2Li^+_{(s)} + O_2^{2-}_{(s)}$
Governing equation: $k_{dissociation} = [Li^+]^2_{(s)} [O_2^{2-}]_{(s)} / [Li_2O_2]_{(s)}$ The transfer of oxygen upon addition of HFE 7000 was also investigated using a three-electrode cell, to check whether oxygen transfer from the FC to the electrolyte was possible. The electrolyte of 0.1 M TBAClO4:DME was purged with Argon, and cyclic voltammetry was performed at a voltage range of −2.5 V to 0.5 V vs Ag/AgCl at the scan rate of 0.1 mV/s (FIG. 26). Oxygen-purged HFE 7000 was added to the solution and stirred. It was found that the current in the oxygen reduction region increased with the addition of the HFE 7000, signifying the ability of the oxygen dissolved in the HFE 7000 to be usable in the reaction. However, there was no oxidation peak observed, which could imply that the reversible TBA-O2 complex formed during reduction might have converted to another species which is not reversible.

Figure 27:
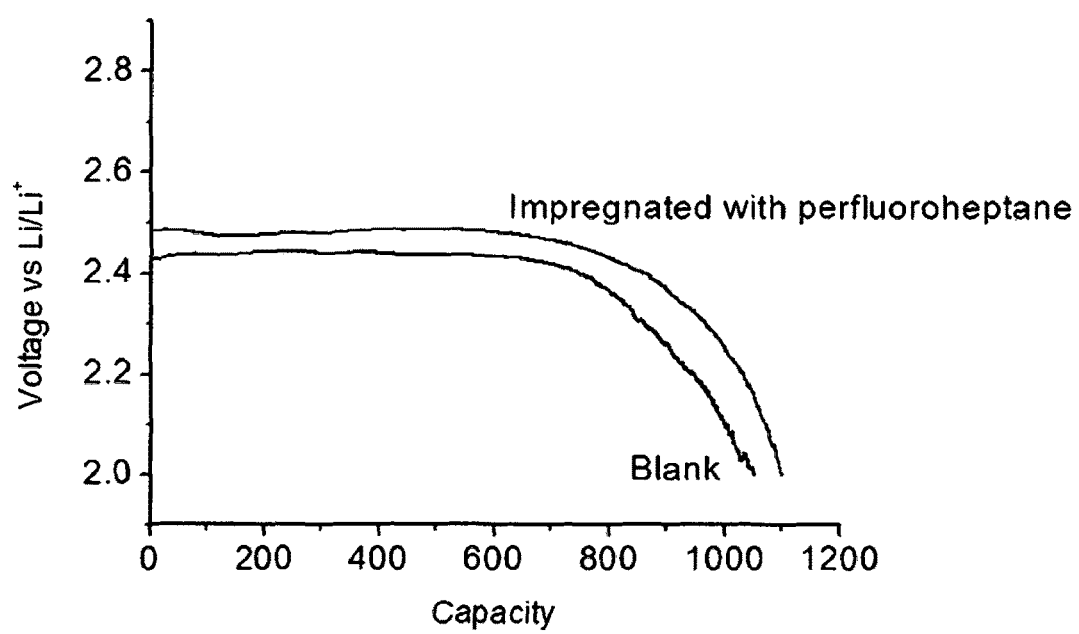
FIG. 27 shows the discharge profile of cathode impregnated with perfluoroheptane.

Impregnation of Perfluoroheptane:

PVDF-HSV 900 was pre-dried-at 60° C. in vacuum and then dissolved in NMP until it reached 6 wt % PVDF in NMP. 240 mg of carbon powder was mixed with the binder solution at a ratio of 20 wt % binder, and 3 ml of NMP was added to the mixture. A Heidolph homogenizer was employed at the speed of 15000 rpm for 5 minutes. The slurry was sonicated using a UP200S Ultrasonic Processor from Hielscher with 50% intensity and 0.5 cycles for 30 seconds. A Celgard monolayer polyethylene was prepared on top of the Doctor Blade coater, to be covered by the slurry. The carbon coating was punched into a 14 mm diameter circle and weighed with a microbalance (Metier Toledo) with a resolution of 0.001 mg. The cathode disk was dried at 90° C. for 12 hours inside a vacuum-sealed portable oven from Buchi, before being transferred to the glovebox. The typical range of electrodes fabricated was 1.5-1.6 mg, with a carbon loading of 0.97-1.03 mgcm$^{-2}$ and thickness of 20 μm. The amount of perfluoroheptane needed to form monolayer is calculated as follow: Surface Area of graphitized acetylene black is 75 m$^2$/gram with the pore volume of 0.33 cc/gram. The perfluoroheptane dynamic radius of 0.704 nm resulted in the calculated area of 0.389 nm$^2$, assuming a spherical shape. The amount of perfluoroheptane to form monolayer in 1 gram of GAB is $(75/0.389 \times 10^{18})/(6.02 \times 10^{23})$=0.321 mmol. For 2 mg of carbon=0.32 mmol×2× $10^{-3}$=0.64×10$^{-3}$ mmol. Mass of perfluoroheptane utilized is 0.248 mg and the volume of perfluoroheptane is 0.142 μl. The perfluoroheptane is then mixed with another organic solvent (optional) which has lower boiling point and able to dissolve perfluoroheptane such as diethyl ether. The mixing is meant to provide a homogeneous dispersion of perfluoroheptane on the cathode. The mixture is then added dropwise to the cathode up to the desirable amount. Subsequently, the cathode is being rested in Argon environment with low water content (glovebox) until the mixture is fully absorbed by the cathode. FIG. 27 shows the discharge profile of a cathode impregnated with perfluoroheptane.

Figure 29:
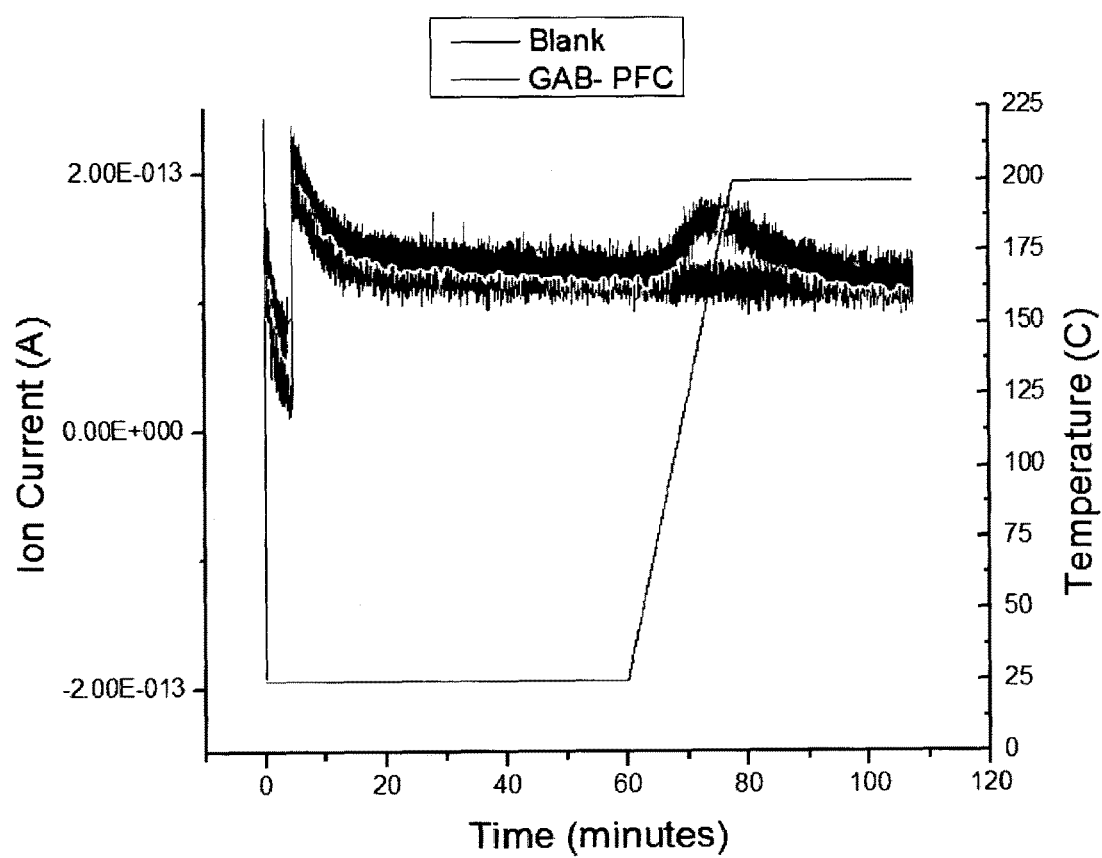
FIG. 29 shows the TGA-MS for the detection of PFC presence 5 mg GAB powder with 15 μl $C_7F_{16}$. 69 signal refers to $CF_3^*$. TGA-MS can be used to detect the presence of PFC in the cathode. Perfluorocarbon is shown to have indeed absorbed into the electrode.

Thermal Gravimetric Analysis-Mass Spectrometer: Thermal gravimetric analysis (Mettler Tolede), coupled with mass spectrometry (Pfeiffer) is done to see whether the perfluorocarbon is indeed absorbed to the cathode or evaporated. The system was put on the isotherm of 25° C. for one hour under constant 50 ml/min Argon flow to get rid of the air and moisture. Subsequently, the temperature is ramped up to 200° C. with the rate of 10° C./minute and kept at constant temperature of 200° C. for 30 minutes. The mass spectrometer detects a current evolution at molecular weight of 69 which refers to CF$_3$ radicals (FIG. 28 and FIG. 29).

Viscosity Measurement:

Viscosity measurement is done on Anton Paar Physica MCR501 Rheometer on the shear rate of 400 s$^{-1}$ at 20° C.

Figure 30:
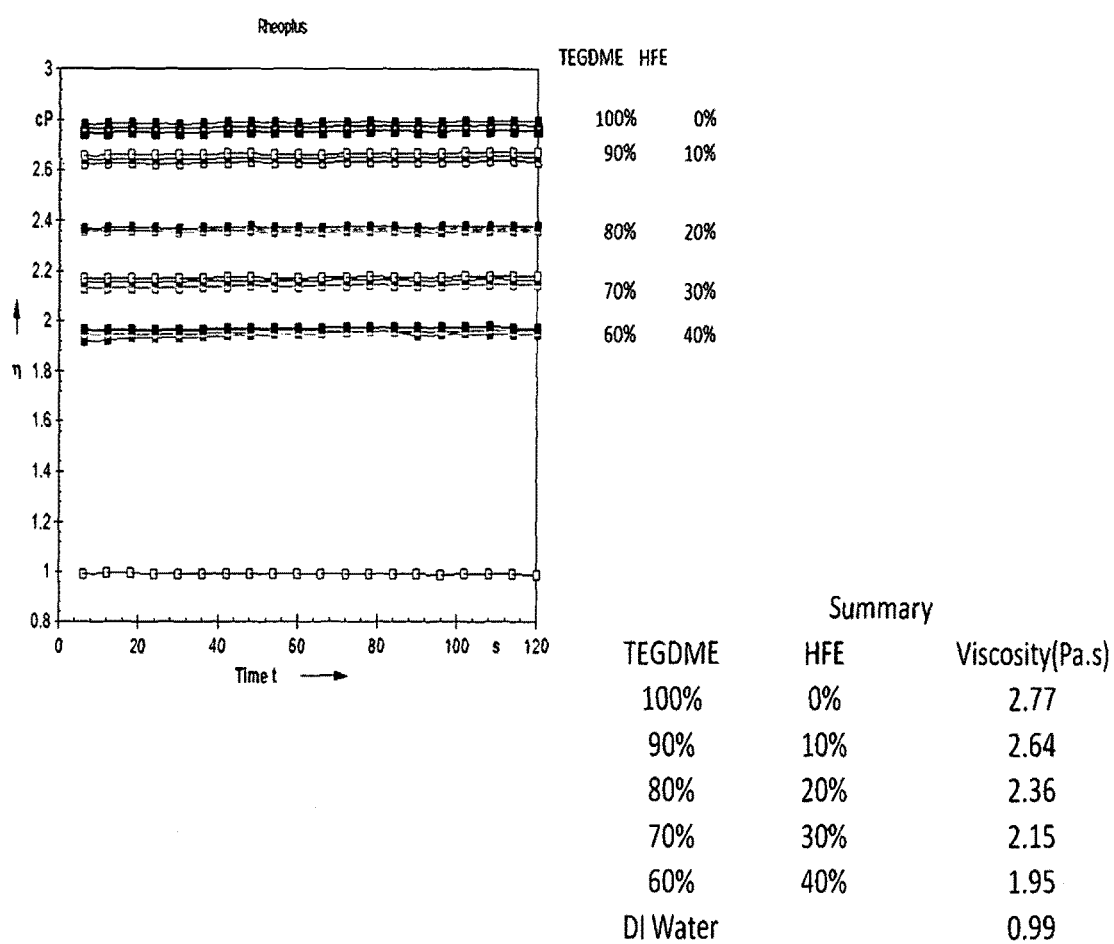
FIG. 30 shows the viscosity measurement data for TEGDME+HFE.

FIG. 30 shows the viscosity measurement data for TEGDME+HFE.

Figure 31:
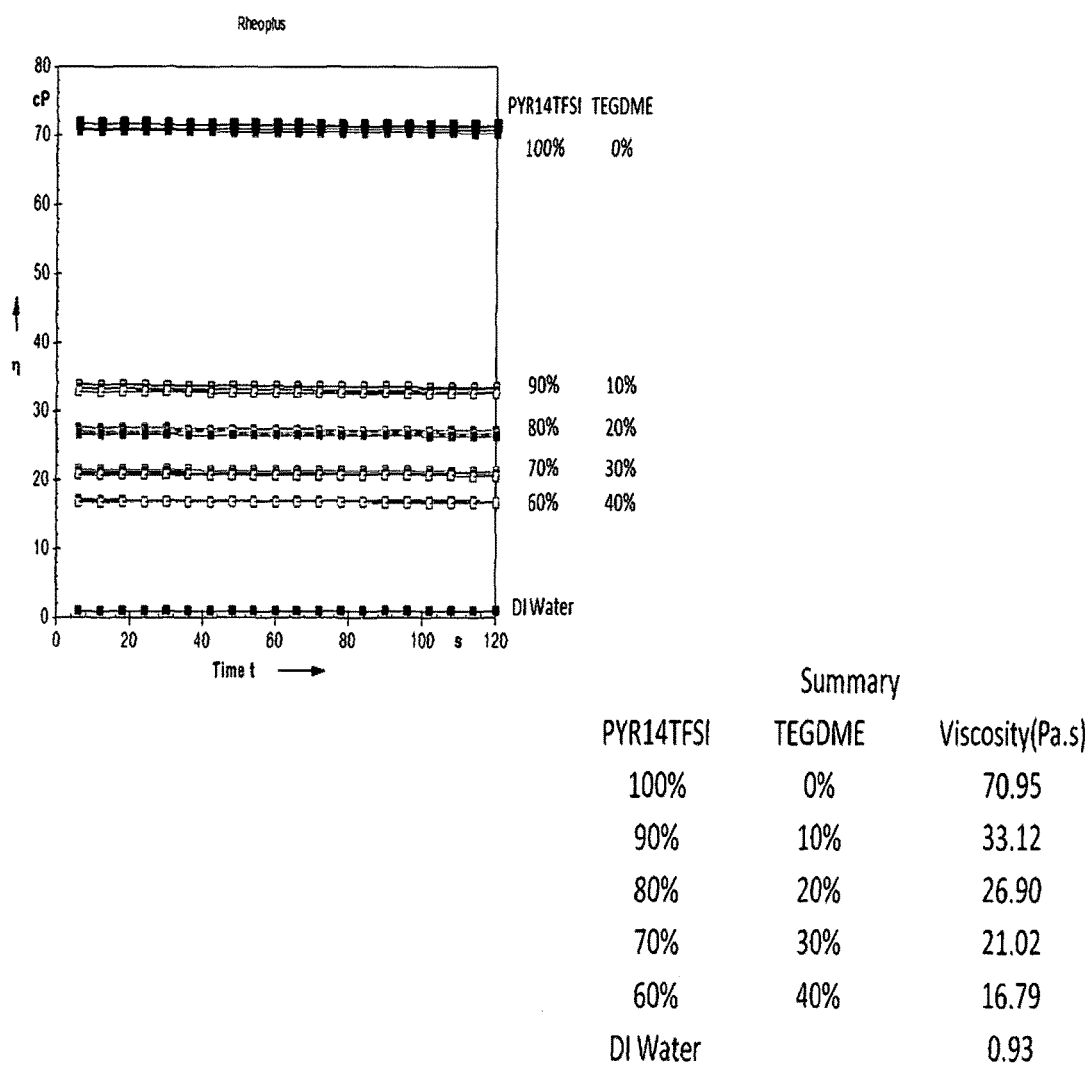
FIG. 31 shows the viscosity measurement data for PYR14TFSI+TEGDME.

FIG. 31 shows the viscosity measurement data for PYR14TFSI+TEGDME.

Figure 32:
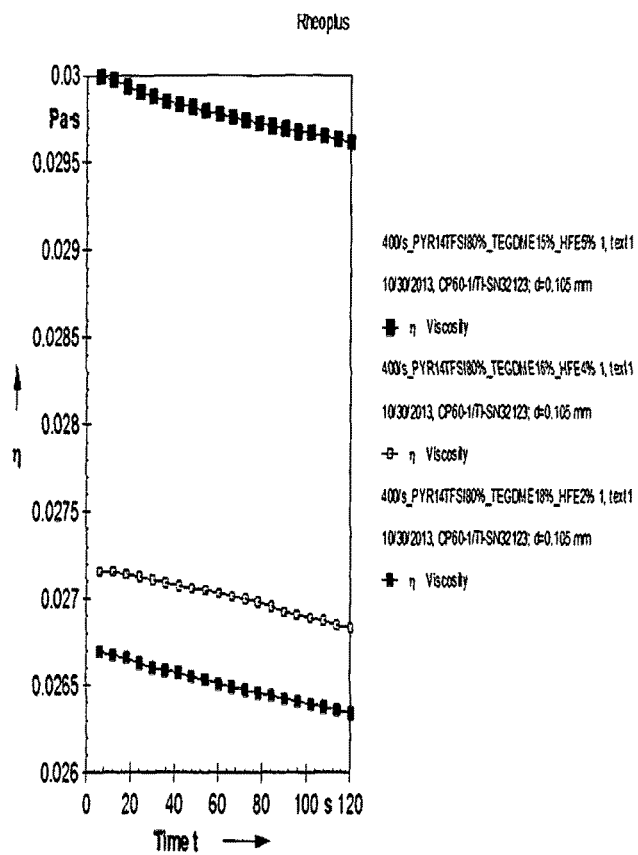
FIG. 32 shows the viscosity measurement data for PYR14TFSI+TEGDME+HFE.

FIG. 32 shows the viscosity measurement data for PYR14TFSI+TEGDME+HFE.

Summary: Lithium oxygen battery has been fabricated by employing graphitized acetylene black as the cathode, 0.1 M LiClO$_4$:DME as the electrolyte and metallic lithium as the anode. Optimization on the cathode and cell engineering has been performed by optimizing cathode thickness and replacing polyethylene washer with Kel-F to reduce the water and gases permeability. Study on the effect of operational discharge parameter was conducted by varying current rate and discharge voltage. At low discharge rate, the end of discharge mechanism is deduced to be physical pore blocking by the discharge product (Li$_2$O$_2$), thus impede the ionic and electronic conductivity. Discharging lithium oxygen battery at different voltage results in more crystalline discharge product at higher voltage with bigger crystallite size compared to those discharged at lower voltage. Subsequent discharge capacity is altered with predischarged at different voltage.

Addition of perfluorocarbon additives on electrolyte demonstrates increase of discharge voltage at all rates tested. However, increase of perfluorocarbon concentration shows decrease of discharge capacity at current rate of 50 mA/gram.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. An electrolyte for a metal air battery, comprising:
a solvent comprising:
a base solvent, wherein the base solvent is an ionic liquid;
a bridging solvent, wherein the bridging solvent is an organic solvent; and
a solute consisting essentially of:
an electron neutral fluorinated carbon compound; and
a metal salt selected from the group consisting of $LiClO_4$, LiBr, LiI, $LiAlCl_4$, and combinations thereof,
wherein the electron neutral fluorinated carbon compound has a general formula R1-$(C_nF_{2n})$—R2, wherein each of R1 and R2 is independently F, H, $C_1$-$C_5$ alkyl, $C_1$-$C_5$ alkoxy, or $C_nF_{2p+1}$, and $1 \leq n \leq 20$, and $1 \leq p \leq 20$.

2. The electrolyte of claim 1, wherein $1 \leq n \leq 10$.

3. The electrolyte of claim 1, wherein $1 \leq p \leq 10$.

4. The electrolyte of claim 1, wherein at least one of R1 and R2 is F.

5. The electrolyte of claim 1, wherein at least one of R1 and R2 is $C_1$-$C_5$ alkyl or $C_1$-$C_5$ alkoxy.

6. The electrolyte of claim 5, wherein n is 3 and R1 is F and R2 is $C_1$-$C_5$ oxyalkyl.

7. The electrolyte of claim 6, wherein the electron neutral fluorinated carbon compound has the formula $CF_3CF_2CF_2OCH_3$ (1-methoxyheptafluoropropane).

8. The electrolyte of claim 1, wherein the bridging solvent comprises an ether.

9. The electrolyte of claim 8, wherein the bridging solvent comprises 1,2-dimethoxyethane (DME, $CH_3OCH_2CH_2OCH_3$) or tetraethyleneglycol dimethyl ether (TEGDME, $CH_3O(CH_2CH_2O)_4CH_3$).

10. The electrolyte of claim 1, wherein the ionic liquid comprises bis(trifluoromethanesulfone)imide (TFSI) anion.

11. The electrolyte of claim 10, wherein the ionic liquid comprises 1-methyl-1-butyl-pyyrolidinium bis(trifluoromethanesulfone)imide (PYR14TFSI).

12. The electrolyte of claim 1, wherein the metal salt is $LiClO_4$ (lithium perchlorate).

13. A metal air battery comprising an electrolyte comprising:
a solvent comprising:
a base solvent, wherein the base solvent is an ionic liquid;
a bridging solvent, wherein the bridging solvent is an organic solvent; and
a solute consisting essentially of
an electron neutral fluorinated carbon compound; and
a metal salt selected from the group consisting of $LiClO_4$, LiBr, LiI, $LiAlCl_4$, and combinations thereof
wherein the electron neutral fluorinated carbon compound has a general formula R1-$(C_nF_{2n})$—R2, wherein each of R1 and R2 is independently F, H, $C_1$-$C_5$ alkyl, $C_1$-$C_5$ alkoxy, or $C_nF_{2p+1}$, and $1 \leq n \leq 20$, and $1 \leq p \leq 20$.

* * * * *

UNITED STATES PATENT AND TRADEMARK OFFICE
CERTIFICATE OF CORRECTION

PATENT NO. : 10,205,207 B2
APPLICATION NO. : 14/761589
DATED : February 12, 2019
INVENTOR(S) : Olivia Wijaya et al.

Page 1 of 1

It is certified that error appears in the above-identified patent and that said Letters Patent is hereby corrected as shown below:

On the Title Page

Item (56), Other Publications, Reference 20:
"Katayama et al., "Electrochemical Behavior of Oxygen/Superoxide Ion Couple in 1-Butyl-1-methylpyrrolidinium Bis(trifluoromethylsulfonyl)imide Room-Temperature Molten Salt," should read, --Katayama et al., "Electrochemical Behavior of Oxygen/Superoxide Ion Couple in 1-Butyl-1-methylpyrrolidinium Bis(trifluoromethylsulfonyl)imide Room-Temperature Molten Salt--

In the Specification

Column 6, Lines 52-54:
"Further examples of lithium salts may include, but are not limited to, LiBr, $LiAsF_6$, $LiAlCl_4$, $LiBF_4$, $LiCF_3SO_3$, $LiN(SO_2CF_3)_2$, or $LiC(SO_2CF_3)_3$" should read, --Further examples of lithium salts may include, but are not limited to, LiBr, LiI, $LiAsF_6$, $LiAlCl_4$, $LiBF_4$, $LiCF_3SO_3$, $LiN(SO_2CF_3)_2$, or $LiC(SO_2CF_3)_3$.--

In the Claims

Column 16, Lines 3-4:
"The electrolyte of claim 8, wherein the bridging solvent comprises 1,2-dimethoxyethane (DME, $CH_3OCH_2CH_2OCH_2$) or tetraethyleneglycol dimethyl ether" should read, --The electrolyte of claim 8, wherein the bridging solvent comprises 1,2-dimethoxyethane (DME, $CH_3OCH_2CH_2OCH_2$) or tetraethyleneglycol dimethyl ether--

Column 16, Lines 9-10:
"The electrolyte of claim 10, wherein the ionic liquid comprises 1-methyl-1-butyl-pyyrolidinium bis(trifluoromethanesulfone)imide (PYR14TFSI)" should read, --The electrolyte of claim 10, wherein the ionic liquid comprises 1-methyl-1-butyl-pyyrolidinium bis(trifluoromethanesulfone)imide (PYR14TFSI)--

Signed and Sealed this
Twenty-seventh Day of August, 2019

Andrei Iancu
*Director of the United States Patent and Trademark Office*